United States Patent
Liu et al.

(10) Patent No.: US 9,286,196 B1
(45) Date of Patent: Mar. 15, 2016

(54) PROGRAM EXECUTION OPTIMIZATION USING UNIFORM VARIABLE IDENTIFICATION

(71) Applicant: ARM LIMITED, Cambridge (GB)

(72) Inventors: Jiangning Liu, Shanghai (CN); Zhenqiang Chen, Shanghai (CN)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/592,221

(22) Filed: Jan. 8, 2015

(51) Int. Cl.
  *G06F 9/46* (2006.01)
  *G06F 9/44* (2006.01)
  *G06F 13/28* (2006.01)
  *G06F 15/00* (2006.01)
  *G06F 11/36* (2006.01)
  *G06F 9/30* (2006.01)
  *G06F 15/16* (2006.01)
  *G06F 13/00* (2006.01)
  *G06F 15/177* (2006.01)
  *G06F 7/00* (2006.01)

(52) U.S. Cl.
  CPC .............. *G06F 11/3688* (2013.01); *G06F 7/00* (2013.01); *G06F 9/30* (2013.01); *G06F 9/30058* (2013.01); *G06F 13/00* (2013.01); *G06F 15/16* (2013.01); *G06F 15/177* (2013.01)

(58) Field of Classification Search
  CPC ..... G06F 9/461; G06F 9/4436; G06F 9/3834; G06F 9/3887; G06F 9/4856; G06F 9/5066; G06F 9/4881; G06F 8/34; G06F 17/30899; G06F 17/5054; G06F 17/505; G06F 17/30294; G06F 17/30572; G06F 17/5004
  See application file for complete search history.

(56) References Cited

U.S. PATENT DOCUMENTS

| | | | | |
|---|---|---|---|---|
| 8,930,926 B2 * | 1/2015 | Bastoul | ............. | G06F 8/453 717/149 |
| 2002/0083297 A1 * | 6/2002 | Modelski | ............. | G06F 9/30058 712/18 |
| 2002/0116442 A1 * | 8/2002 | Modelski | ............. | H04L 45/60 718/106 |
| 2002/0116449 A1 * | 8/2002 | Modelski | ............. | G06F 15/17 709/203 |
| 2002/0116587 A1 * | 8/2002 | Modelski | ............. | G06F 13/36 711/154 |
| 2002/0120798 A1 * | 8/2002 | Modelski | ............. | H04L 12/403 710/107 |
| 2002/0120828 A1 * | 8/2002 | Modelski | ............. | G06F 5/14 712/200 |
| 2002/0129340 A1 * | 9/2002 | Tuttle | ............. | G06F 17/30867 717/132 |
| 2009/0077540 A1 * | 3/2009 | Zhou | ............. | G06F 11/3612 717/126 |
| 2009/0300615 A1 * | 12/2009 | Andrade | ............. | G06F 9/5066 718/100 |
| 2011/0084839 A1 * | 4/2011 | Groth | ............. | G06Q 10/087 700/215 |
| 2011/0161944 A1 * | 6/2011 | Cho | ............. | G06F 8/433 717/149 |
| 2012/0030650 A1 * | 2/2012 | Ravindran | ............. | G06F 8/34 717/107 |

(Continued)

OTHER PUBLICATIONS

Jaewook Shin, Introducing Control Flow into Vectorized Code, IEEE 2007, [Retrieved on Oct. 19, 2015]. Retrieved from the internet: <URL: http://dl.acm.org/citation.cfm?id=1299055> 11 Pages (280-291).*

(Continued)

*Primary Examiner* — Thuy Dao
*Assistant Examiner* — Anibal Rivera
(74) *Attorney, Agent, or Firm* — Nixon & Vanderhye P.C.

(57) ABSTRACT

A method, apparatus and computer program, each for optimizing execution of a computer program is disclosed in which a topology-based control flow analysis of basic blocks of the computer program is performed and a data flow analysis of the instructions within the basic blocks is performed to determine if each instruction of said computer program is uniform or non-uniform (variant or invariant). Subsequently, when the computer program is executed, storage of a copy of a variable dependent on a uniform instruction is suppressed.

16 Claims, 21 Drawing Sheets

(56) References Cited

U.S. PATENT DOCUMENTS

| | | | | |
|---|---|---|---|---|
| 2012/0117535 | A1* | 5/2012 | Pointer | G06F 8/33 717/107 |
| 2012/0131309 | A1* | 5/2012 | Johnson | G06F 9/30 712/41 |
| 2012/0297163 | A1* | 11/2012 | Breternitz | G06F 9/5066 712/22 |
| 2013/0212365 | A1* | 8/2013 | Chen | G06F 17/5054 713/1 |
| 2013/0212366 | A1* | 8/2013 | Chen | G06F 17/5054 713/1 |
| 2013/0219377 | A1* | 8/2013 | Glaister | G06F 8/433 717/146 |
| 2014/0040855 | A1* | 2/2014 | Wang | G06F 9/4436 717/107 |
| 2015/0154011 | A1* | 6/2015 | Ceng | G06F 8/51 717/137 |

OTHER PUBLICATIONS

Ralf Karrenberg et al., Improving Performance of OpenCL on CPUs, 2012, [Retrieved on Oct. 19, 2015]. Retrieved from the internet: <URL: http://link.springer.com/chapter/10.1007/978-3-642-28652-0_1> 20 Pages (1-20).*

Gregory Diamos et al., Ocelot: A Dynamic Optimization Framwork for Bul-Synchronous Applications in Heterogeneous Systems, Sep. 11-15, 2010, [Retrieved on Oct. 19, 2015]. Retrieved from the internet: <URL: http://dl.acm.org/citation.cfm?id=1854318> 12 Pages (353-364).*

Lee et al., "Convergence and Scalarization for Data-Parallel Architectures", *CGO '13*, Feb. 23-27, 2013, pp. 182-192.

Coutinho et al. "Divergence Analysis and Optimizations", *Divergence Analysis and Optimizations*, Feb. 8, 2011, pp. 1-11.

Fung et al., "Dynamic Warp Formation and Scheduling for Efficient GPU Control Flow", *Univ. of British Columbia—Department of Electrical & Computer Engineering*, Dec. 1-5, 2007, twelve (12) pages.

Karrenberg et al., "Improving Performance of OpenCL on CPUs", *Searland University*, Mar. 24, 2012, twenty (20) pages.

A. Munshi (Editor), "The OpenCL Specification", *Khronos OpenCL Working Group*, version 1.2, Document Revision: 19, Nov. 14, 2012 (last revision date), pp. 1-380.

* cited by examiner

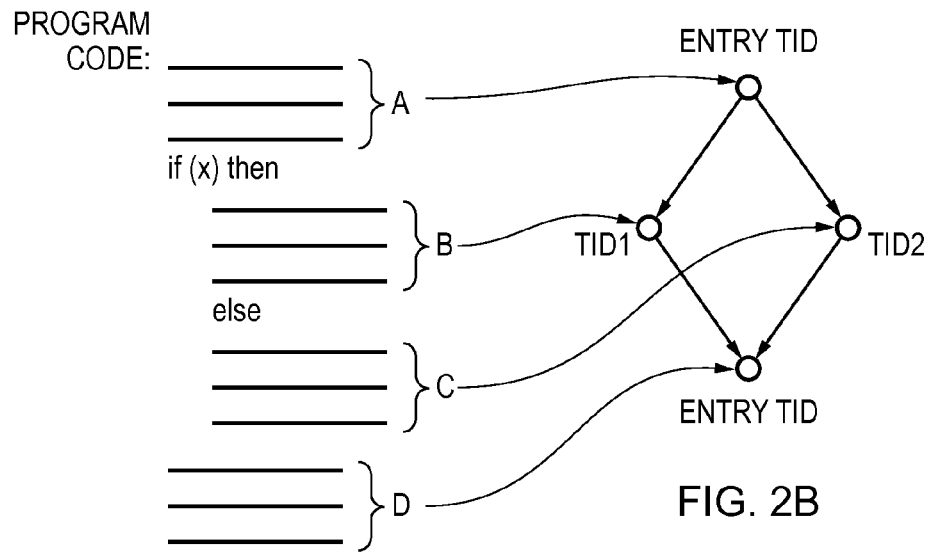
FIG. 2A
FIG. 2B
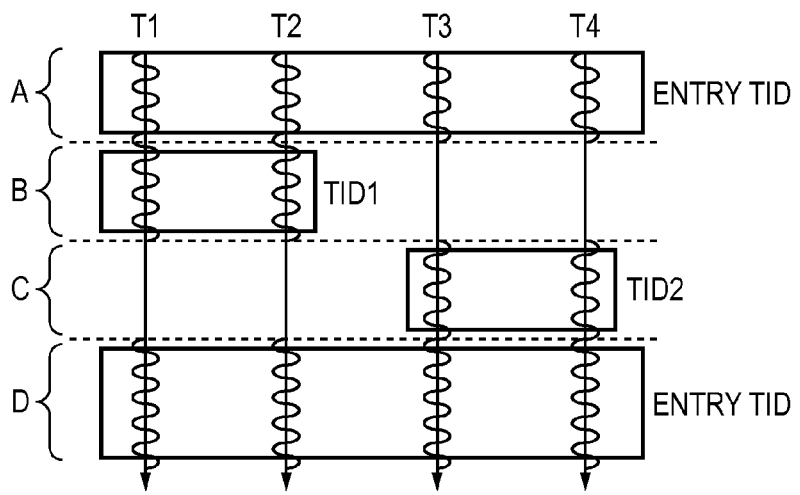
FIG. 2C

```
// Calculate new TIDs for block BB using some rules, and get it returned.
ComputeTIDs(BB)
{
    TID_New = NULL;

if (!HasBarrier(BB) && BB != Entry) {
        // a) collect all TIDs from predecessor
        TID_New = TID(all predecessors of BB);

// b) recover TIDs from TIDCreater, which is immediately post dominated by BB.
        // ipdee_bb means immediate post dominatee, i.e. the block immediately post
        // dominated by BB.
        for (each block ipdee_bb being immediately post dominated by BB) {
            if (TIDCreater(ipdee_bb))
                TID_New += TID(ipdee_bb);
        }

// c) kill TIDs created by TIDCreater, which is immediatly post dominated by BB
        for (each block ipdee_bb being immediately post dominated by BB) {
            if (TIDCreater(ipdee_bb))
                TID_New -= TID(all sucessors of ipd_bb);
        }
    } else {
        // For entry block or block containing barrier, we assign EntryTID forever.
        TID_New = {EntryTID};
    }
    return TID_New;
}
```

FIG. 10A

```
// Return false, if II is not invariant, and true otherwise.
ComputeInvariant(II)
{
    // If we already know II is not invariant, return false.
    if (!Invariant[II]) return false;

// If one of II's operands is not invariant, we say II is not invariant.
    for (each operand OP of II) {
        if (!Invariant[OP]) return false;
    }

// Collect TIDs from all operands.
    for (each operand OP of II) {
        TID_OP += TID[OP];
    }

// If Phi node has data sources from more than 1 TID, we say II is not invariant.
    if (IsPhi(II) && TID_OP.count() > 1 ) return false;

// If II is natively thread-dependent, we say II is not invariant.
    // For example, in OpenCL, builtin function get_global_id(0) must be invariant.
    if (ThreadDependent(II)) return false;
    return true;
}

CreateTID(II)
{
    for (each successor SI of II) {
        Tag_ID_BB = CreateBlock(SI, II); // on edge from II to SI // Assign new tag ID for each newly created tagged block, which is a dummy block
        // for recording tag ID purpose only.
        TID[Tag_ID_BB] = TagID++;
    }
}
```

FIG. 10A (Continued)

```
/* initialization */
worklist = null;
for (each BB in topo sort order) {
    divergent[BB] = TIDCreater[BB] = false;
    Worklist.push(BB);
    for (instr in instructions(BB)) {
        invariant[instr] = true;
    }
}

/* propagation */
TagID = 0;
while (worklist) {
    BB = worklist.pop();
    pushlist = null;

// Before analyzing all instructions in BB, we calculate new TIDs of BB following
    // some rules.
    TID_New = ComputeTIDs(BB);

// If we find new TIDs for BB changes, we will try to push some more BBs into worklist,
    // because we need to propagate the update TIDs to other related BBs following
    // control flow.
    if (TID_New != TID[BB]) {
        //Record the newly calculated TID value.
        TID[BB] = TID_New;

// If BB is not a TIDCreater, we push all successors into worklist via pushlist.
        // This is to propagate TID through control flow.
        if (!TIDCreater(BB))
            pushlist.insert(all successors of BB);

// Blocks containing phi with operands defined in BB need to be pushed into worklist
        // via pushlist. This is to propagate TID through data flow.
        for (each instruction IB in BB)
            for (each user IU of IB)
                if (IsPhi(IU))
                    pushlist.insert(the block containing IU);
    }
}
```

FIG. 10B

```
// Now analyze all instructions inside BB.
for (each instruction II in BB) {
    InvariantNew = ComputeInvariant(II);

// If previously II is invariant, and now it is changed to be not invariant,
    // we will try to propagate variant information. If we've already known II is
    // not invariant, we will not propagate variant information again.
    if (Invariant[II] && !InvariantNew) {
        // Update variant information.
        Invariant[II] = false;

// The users of variant value must be variant, so push the block containing
        // the user into worklist via pushlist.
        for (each instruction I using value II) {
            pushlist.insert(the block containing I);
        }

// For variant branch, we will create new tag IDs.
        if (IsCondBranch(II) && (TI->getNumSuccessors() > 1) && !TIDCreater(BB)) {
            TIDCreater[BB] = true;
            pushlist.insert(all successors of BB);
            CreateTID(II);
        }
    }
} worklist.push(all blocks in pushlist);

}

// Calculate divergent block information, which is not useful inside the algorithm above, but
// it could be useful for optimizations using this uniform analysis algorithm.
for (each BB) {
    divergent[bb] = (TID[BB] != {EntryTID});
}
```

FIG. 10B (Continued)

| | | |
|---|---|---|
| __kernel void f(__global int *p, int c) { | | define void @f.kernel(i8* %__mcl_ctx, i32 addrspace(1)* nocapture %p, i32 %c) #0 { |
| int i, j, k; | C | entry: |
| /* get_global_id() returns thread ID */ | V | %call = tail call i32 @_Z13get_global_idj(i32 0) #5 |
| k = get_global_id(0) + 4; | V | %add = add i32 %call, 4 |
| if (p[k] < 16) { | V | %arrayidx = getelementptr inbounds i32 addrspace(1)* %p, i32 %add |
| j = 1; | V | %0 = load i32 addrspace(1)* %arrayidx, align 4 |
| if (c) { | V | %cmp = icmp slt i32 %0, 16 |
| i = 1; | V | br i1 %cmp, label %TagID1, label %TagID2 |
| p[1] = k; | | |
| } | D | TagID1:    ; preds = %entry |
| else { | | br label %if.then |
| i = 2; | | |
| p[2] = 2; | D | if.then:    ; preds = %TagID1 |
| } | I | %tobool = icmp eq i32 %c, 0 |
| barrier(CLK_GLOBAL_MEM_FENCE); | I | br i1 %tobool, label %if.else, label %if.then1 |
| p[3] = i; | | |
| } | D | if.then1:   ; preds = %if.then |
| barrier(CLK_GLOBAL_MEM_FENCE); | I | %arrayidx2 = getelementptr inbounds i32 addrspace(1)* %p, i32 1 |
| p[0] = j; | V | store i32 %add, i32 addrspace(1)* %arrayidx2, align 4 |
| } | I | br label %if.end |

CFG for 'f.kernel' function

```
CleanUse(I, opnd)
{
    if (IsInStateKernel(def(opnd))) {
        if (!Dominates(def(opnd), I)) {
            loop = FindLoopContaining(def(opnd));
            if (loop) {
                phi = CreatePhiIn(loop);
                if (Dominates(phi, I)) {
                    *opnd = phi; /* x in block E of state1 */
                } else {
                    *opnd = LiveIn(def(opnd)); /* x in block D of state1 */
                }
            } else {
                *opnd = LiveIn(def(opnd)); /* y in block D of state1 */
            }
        } else {
            /* do nothing. x in block C of state1 */
        }
    } else {
        *opnd = LiveIn(def(opnd)); /* z in block F of state1 */
    }
}
```

FIG. 14

PROGRAM EXECUTION OPTIMIZATION USING UNIFORM VARIABLE IDENTIFICATION

FIELD OF THE INVENTION

The present invention relates to the optimization of computer programs for execution. In particular it relates to the identification of uniform variables.

BACKGROUND OF THE INVENTION

It is becoming ever more common for computing devices to be constructed in a heterogeneous fashion, i.e. composed of a system made up of different computational devices, and for those computing devices to be programmed according to data parallel programming models, e.g. single program multiple data (SPMD) models or single instruction multiple thread (SIMT) models.

Implementations of SPMD/SIMT programming models such as Open Computing Language (OpenCL) have therefore been developed to enable programmers to take advantage of the increased processing power provided by such heterogeneous computing systems, whilst presenting the programmer with a programming framework which can be employed across different computing platforms.

Whilst such programming models advantageously present the programmer with a unified, and therefore simplified, programming view, it will be understood that various complexities associated with executing programs written for such heterogeneous computing systems must then be handled by the background systems provided to support them, such as the compiler.

One issue that may need to be handled relates to the multiple threads which may be executed in heterogeneous computing systems programmed in this manner. In particular, it is clearly desirable to avoid redundant processing by each of those threads, where the nature of the operations involved is such that it is not necessary for each individual thread to perform particular operations or maintain individual copies of variables.

Compilers have thus been developed which seek to automatically detect any scalar operations and factor them out of the parallel execution. One aspect of this process is the identification of uniform (also known as invariant) instructions and variables, which can be determined to be invariant across multiple threads. Identification of such uniform instructions/variables can therefore mean that only one copy of the relevant value needs to be kept for all threads, since all threads operate with respect to the same value. This optimisation can not only save memory allocation, but also improve performance by reducing the redundant storage of live variable context.

Examples of the state of the art relating to such optimisation techniques can be found in the following documents:

Yunsup Lee et al., "Convergence and Scalarization for Data-Parallel Architectures", in Proceedings of the 2013 IEEE/ACM International Symposium on Code Generation and Optimization (CGO), Feb. 23-27, 2013, Shenzhen, China;

Ralf Karrenberg and Sebastian Hack, "Improving Performance of OpenCL on CPUs", in Proceedings of the 21st International Conference on Compiler Construction 2012, pp. 1-20;

Wilson Fung et al., "Dynamic warp formation and scheduling for efficient GPU control flow", in MICRO, Proceedings of the 40th Annual IEEE/ACM International Symposium on Microarchitecture, pp. 407-420, IEEE 2007;

The OpenCL 1.2 Specification, revised on 14 Nov. 2012, available at: http://www.khronos.org/registry/cl/specs/opencl-1.2.pdf; and Bruno Coutinho et al., "Divergence Analysis and Optimizations", in Parallel Architectures and Compilation Techniques (PACT), October 2011, pp. 320-329.

However, it has been found that current approaches to the identification of uniform variables tend in some instances to be overly conservative (in that some variables which are in fact uniform are not identified as such).

Accordingly, it would be desirable to provide an improved technique for the identification of uniform variables.

SUMMARY OF THE INVENTION

Viewed from a first aspect, the present invention provides a method of optimizing execution of a computer program, the method comprising the steps of:

identifying basic blocks of instructions within the computer program, wherein each basic block has only one entry point and only one exit point;

performing a topology-based control flow analysis of the basic blocks to associate at least one tag ID with each basic block, wherein a tag ID identifies at least one run-time thread having a given run-time instruction sequence;

performing a data flow analysis of instructions within the basic blocks and their associated tag IDs to determine if each instruction of said computer program is uniform or non-uniform, wherein a uniform instruction has a same value for all tag IDs associated with the basic block containing the uniform instruction, wherein, in the data flow analysis, for each immediate successor basic block of an analysed basic block, if the analysed basic block ends with a non-uniform conditional branch instruction, a dummy block is generated on each edge from the analysed basic block to the immediate successor basic block and a new tag ID is generated for association with each dummy block, wherein, in the topology-based control flow analysis, if the analysed basic block immediately post-dominates a second basic block and the second basic block ends with a non-uniform conditional branch instruction, any tag IDs associated with the second basic block are associated with the analysed basic block, wherein, in the topology-based control flow analysis, if the analysed basic block immediately post-dominates a third basic block, and the third basic block ends with a non-uniform conditional branch instruction, tag IDs of successors of the third basic block are dissociated from the analysed basic block, and wherein a phi instruction is determined to be non-uniform, wherein the phi instruction merges two or more variable definitions into a single variable definition from plural predecessor basic blocks of the analysed basic block, if operands of the phi instruction originate in basic blocks which are associated with more than one tag ID;

and suppressing storage, when the computer program is executed, of a copy of a variable dependent on a uniform instruction.

Viewed from a second aspect, the present invention provides a data processing apparatus configured to carry out the method of the first aspect.

Viewed from a third aspect, the present invention provides a computer-readable storage medium storing in a non-transient fashion a computer program configured to carry out the method of the first aspect.

Viewed from a fourth aspect, the present invention provides a data processing apparatus configured to optimize execution of a computer program, the data processing apparatus comprising:

means for identifying basic blocks of instructions within the computer program, wherein each basic block has only one entry point and only one exit point;

means for performing a topology-based control flow analysis of the basic blocks to associate at least one tag ID with each basic block, wherein a tag ID identifies at least one run-time thread having a given run-time instruction sequence;

means for performing a data flow analysis of instructions within the basic blocks and their associated tag IDs to determine if each instruction of said computer program is uniform or non-uniform, wherein a uniform instruction has a same value for all tag IDs associated with the basic block containing the uniform instruction, wherein, in the data flow analysis, for each immediate successor basic block of an analysed basic block, if the analysed basic block ends with a non-uniform conditional branch instruction, a dummy block is generated on each edge from the analysed basic block to the immediate successor basic block and a new tag ID is generated for association with each dummy block, wherein, in the topology-based control flow analysis, if the analysed basic block immediately post-dominates a second basic block and the second basic block ends with a non-uniform conditional branch instruction, any tag IDs associated with the second basic block are associated with the analysed basic block, wherein, in the topology-based control flow analysis, if the analysed basic block immediately post-dominates a third basic block, and the third basic block ends with a non-uniform conditional branch instruction, tag IDs of successors of the third basic block are dissociated from the analysed basic block, and wherein a phi instruction is determined to be non-uniform, wherein the phi instruction merges two or more variable definitions into a single variable definition from plural predecessor basic blocks of the analysed basic block, if operands of the phi instruction originate in basic blocks which are associated with more than one tag ID;

and means for suppressing storage, when the computer program is executed, of a copy of a variable dependent on a uniform instruction.

BRIEF DESCRIPTION OF THE DRAWINGS

The present invention will be described further, by way of example only, with reference to embodiments thereof as illustrated in the accompanying drawings, in which:

FIGS. 2A, 2B and 2C schematically illustrate the correspondence of basic blocks to original program code, the allocation of tag IDs and the correspondence of tag IDs to run-time threads;

FIGS. 10A and 10B show an example pseudo-code implementation of the method of one embodiment;

FIG. 14 illustrates a pseudo-code example of the replacement of original uses of live variable context which are thread-dependent with a new value;

DESCRIPTION OF EMBODIMENTS

Figure 1:
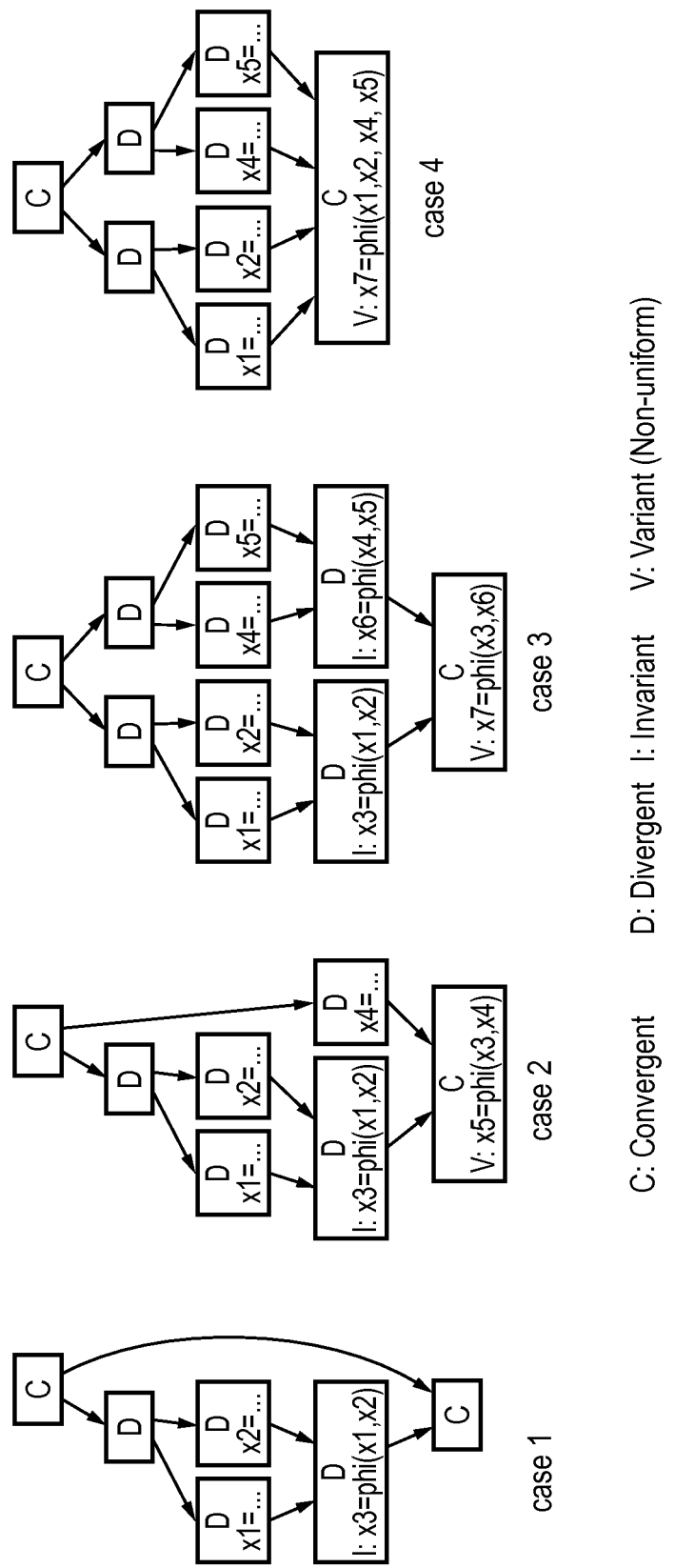
FIG. 1 schematically illustrates four different example control flow graphs.

Viewed from a first aspect, the present invention provides a method of optimizing execution of a computer program, the method comprising the steps of:

identifying basic blocks of instructions within the computer program, wherein each basic block has only one entry point and only one exit point;

performing a topology-based control flow analysis of the basic blocks to associate at least one tag ID with each basic block, wherein a tag ID identifies at least one run-time thread having a given run-time instruction sequence;

performing a data flow analysis of instructions within the basic blocks and their associated tag IDs to determine if each instruction of said computer program is uniform or non-uniform, wherein a uniform instruction has a same value for all tag IDs associated with the basic block containing the uniform instruction, wherein, in the data flow analysis, for each immediate successor basic block of an analysed basic block, if the analysed basic block ends with a non-uniform conditional branch instruction, a dummy block is generated on each edge from the analysed basic block to the immediate successor basic block and a new tag ID is generated for association with each dummy block, wherein, in the topology-based control flow analysis, if the analysed basic block immediately post-dominates a second basic block and the second basic block ends with a non-uniform conditional branch instruction, any tag IDs associated with the second basic block are associated with the analysed basic block, wherein, in the topology-based control flow analysis, if the analysed basic block immediately post-dominates a third basic block, and the third basic block ends with a non-uniform conditional branch instruction, tag IDs of successors of the third basic block are dissociated from the analysed basic block, and wherein a phi instruction is determined to be non-uniform, wherein the phi instruction merges two or more variable definitions into a single variable definition from plural predecessor basic blocks of the analysed basic block, if operands of the phi instruction originate in basic blocks which are associated with more than one tag ID;

and suppressing storage, when the computer program is executed, of a copy of a variable dependent on a uniform instruction.

The inventors of the present invention have developed a systematic approach to the identification of uniform variables in a computer program, in which a combined topology-based control flow analysis and data flow analysis are used. In particular, basic blocks of instructions in the computer program are analysed according to a control flow graph of those basic blocks and at least one "tag ID" is associated with each basic block (mathematically speaking, a set of tag IDs is associated with each basic block, where it will be understood that the "set" may in some instances only contain one tag ID). Each tag ID identifies at least one run-time thread having a given run-time instruction sequence, i.e. those run-time threads which will actually execute data processing operations corresponding to the instructions in the computer program. Each tag ID may correspond to more than one run-time thread (since a given block of program instructions may be parallelized and executed by more than one run-time thread), and each tag ID may be generally be identified with a different control-flow path through the computer program. With respect to uniform instructions or variables, it is important to note that a uniform instruction (value) will have the same value for all tag IDs associated with the basic block which contains that uniform instruction.

In order to correctly propagate the (non)-uniform nature of a given instruction or variable through the computer program, the program is subjected to a combined topology-based control flow and data flow analysis, in which basic blocks which end with a non-uniform conditional branch instruction have a particular significance, due to their consequences for instructions and variables which may be used within each possible branch. In other words, these are branch instructions from which two different paths can be taken, in which a given variable will have a different value—and therefore be non-uniform. In some embodiments such a basic block is labelled by the analysis as a "tag ID creator". In order to handle the analysis of the logical branches which follow such a basic block ending with a non-uniform conditional branch instruction, a dummy basic block is generated on each edge leading from it to its immediate successor basic blocks and a new tag ID is generated for association with each of those dummy blocks. Each dummy block thus enables a new tag ID to be generated and associated with it, and the separate logical paths which may then be followed after the non-uniform conditional branch instruction can then be tracked with their corresponding tag IDs associated with them.

In order to identify correctly the extent of the onward effect in the control/data flow of the non-uniform nature of these non-uniform conditional branch instructions, any tag IDs associated with such a basic block (marked in some embodiments as a "tag ID creator" basic block) are then associated by the analysis with any basic blocks of instructions which immediately post dominate that "tag ID creator" basic block. This therefore allows the set of tag IDs present before the branching occurred to be carried forward to a point in the control flow which must inevitably be reached after that branching has happened. This then identifies the points in the control flow graph at which the different possible logical paths which may be followed after the non-uniform conditional branch instruction recombine. Since the divergence ends at this point (basic block), and therefore a united flow resumes from this point, as a further step in the analysis process, any additional tag IDs associated with the divergent branches and created by the "tag ID creator" basic block are removed from this point (basic block). These additional tag IDs created by the "tag ID creator" basic block are found by examination of the successors of the "tag ID creator" basic block.

As such, tag IDs corresponding to the different logical paths which may be followed through the control flow graph are accurately associated with each basic block of the computer program, in particular allowing both for the non-uniform divergence which follows a non-uniform conditional branch instruction (by the association of new tag IDs for each branch) and for the reunification of the logical flow of the program (at points where those new tag IDs should then disappear).

Finally the analysis identifies instructions within the program which may be termed "phi instructions", these being instructions which merge two or more variable definitions into a single variable definition from plural predecessor basic blocks in the program. If a phi instruction has operands which originate in basic blocks which are associated with more than one tag ID, then the phi instruction is determined to be non-uniform. Since basic blocks which are associated with different tag IDs must be associated with different branches following a non-uniform conditional branch instruction, this means that the single variable definition being generated by the phi instruction had dependencies in different branches following that non-uniform conditional branch instruction and must itself be considered non-uniform. It is important to note here that such "phi" instructions may not explicitly form part of the original program code (as written in a high-level programming language by the programmer) but may only "emerge" as part of the program as the result of the necessary compilation process of that program. More generally, the same applies to any instruction referred to here, in that the determination of the (non)-uniformity of instructions in the computer program will ultimately be determined with reference to the raw instructions that are executed (for example in assembler form).

The analysis algorithm enables a systematic, full and accurate determination of the (non)-uniformity of instructions in a computer program to be determined and therefore allows various performance optimizations to be made when the program is executed. In particular, the storage of redundant copies of variables, where those variables are determined to be uniform and therefore do not require multiple thread-dependent copies to be stored, can be avoided.

It will be recognised that there are various ways in which the topology-based control flow analysis and the data flow analysis could be combined, but in one embodiment the data flow analysis is nested within the topology-based control flow analysis. This results in a particularly efficient overall analysis flow, in which dependencies identified in the data flow analysis are directly introduced to the topology-based control flow analysis, and additional iterations of the overall analysis can be avoided.

In one embodiment performing the topology-based control flow analysis of the basic blocks further comprises associating tag IDs of all predecessor basic blocks of the analysed basic block with the analysed basic block. This efficiently allows the propagation of tag IDs through the control flow graph associated with the computer program.

In one embodiment the topology-based control flow analysis is initiated by pushing each basic block onto a worklist in topological sort order and the topology-based control flow analysis is iteratively performed on the basic blocks by popping a next basic block from the worklist at each iteration. Handling the blocks in this topological sort order results in an efficient processing of the control flow analysis, in which for example multiple analysis passes can be kept to a minimum.

In one embodiment if at least one tag ID associated with a selected basic block changes during the topology-based control flow analysis, and the selected basic block does not end with a non-uniform conditional branch instruction, the successor basic blocks of the selected basic block are pushed onto the worklist. This provides an efficient manner of processing the basic blocks in the control flow analysis in which a change in tag ID at a given point the control flow graph can be followed through to the basic blocks which follow that point. The worklist is then handled as a queue (in that items are pushed onto the back of it and popped off the front of it) and these following basic blocks will then be queued up as further basic blocks to be (re)analysed, allowing the change in tag ID to be directly propagated through the control graph, and additional passes through the graph that might otherwise be needed are avoided.

In one embodiment if at least one tag ID associated with a further selected basic block changes during the topology-based control flow analysis, and if a second further selected basic block containing a phi instruction with operands defined in the further selected basic block is found, the second further selected basic block is pushed onto the worklist.

In one embodiment if an instruction is determined to be non-uniform in the data-flow analysis, a further instruction which has that instruction as an operand is determined to be non-uniform. This ensures that such "derivative" non-uniformity is propagated through the data-flow analysis. Further, in one embodiment a basic block comprising the further instruction is pushed onto the worklist. This then places that basic block "next in the queue" for analysis, efficiently propagating the non-uniformity and reducing the need for further analysis passes.

In one embodiment a basic block which ends with a non-uniform conditional branch instruction is marked as "tag ID creator". Applying this label to the basic block facilitates the subsequent analysis.

In one embodiment if an instruction is newly determined to be a non-uniform conditional branch instruction in the data-flow analysis, the analysed basic block is marked as tag ID creator and each basic block which is a successor of the analysed basic block is pushed onto the worklist. This provides that, on the one hand, the new tag IDs created as a result of labelling the analysed basic block as tag ID creator are only created once, but also on the other hand, that those successor basic blocks are placed "next in the queue" for analysis, efficiently propagating the newly created tag IDs through the control graph and reducing the need for further analysis passes.

In one embodiment for a barrier basic block comprising a barrier instruction, an entry tag ID associated with an entry basic block of the computer program is associated with the barrier basic block. A barrier instruction results in an intra-system updating of variables, and accordingly such divergence and non-uniformity which may have arisen up to this point will be removed by the execution of the barrier instruction.

In one embodiment a natively thread-dependent instruction is determined to be non-uniform. Where an instruction is natively thread-dependent, i.e. the thread-dependency is an inherent feature of the instruction (for example where the instruction explicitly takes the run-time thread ID as a variable) rather than specifically as a result of the compilation process, that instruction can only be non-uniform.

In one embodiment each basic block is initially labelled as convergent and the method comprises a further step of labelling any basic block which is associated with more than an entry tag ID associated with an entry basic block of the computer program as divergent. This categorization of the basic blocks as convergent or divergent represents a useful analysis tool, upon which further optimisations may be based.

Viewed from a second aspect, the present invention provides a data processing apparatus configured to carry out the method of the first aspect.

Viewed from a third aspect, the present invention provides a computer-readable storage medium storing in a non-transient fashion a computer program configured to carry out the method of the first aspect.

Viewed from a fourth aspect, the present invention provides a data processing apparatus configured to optimize execution of a computer program, the data processing apparatus comprising:

means for identifying basic blocks of instructions within the computer program, wherein each basic block has only one entry point and only one exit point;

means for performing a topology-based control flow analysis of the basic blocks to associate at least one tag ID with each basic block, wherein a tag ID identifies at least one run-time thread having a given run-time instruction sequence;

means for performing a data flow analysis of instructions within the basic blocks and their associated tag IDs to determine if each instruction of said computer program is uniform or non-uniform, wherein a uniform instruction has a same value for all tag IDs associated with the basic block containing the uniform instruction, wherein, in the data flow analysis, for each immediate successor basic block of an analysed basic block, if the analysed basic block ends with a non-uniform conditional branch instruction, a dummy block is generated on each edge from the analysed basic block to the immediate successor basic block and a new tag ID is generated for association with each dummy block, wherein, in the topology-based control flow analysis, if the analysed basic block immediately post-dominates a second basic block and the second basic block ends with a non-uniform conditional branch instruction, any tag IDs associated with the second basic block are associated with the analysed basic block, wherein, in the topology-based control flow analysis, if the analysed basic block immediately post-dominates a third basic block, and the third basic block ends with a non-uniform conditional branch instruction, tag IDs of successors of the third basic block are dissociated from the analysed basic block, and wherein a phi instruction is determined to be non-uniform, wherein the phi instruction merges two or more variable definitions into a single variable definition from plural predecessor basic blocks of the analysed basic block, if operands of the phi instruction originate in basic blocks which are associated with more than one tag ID;

and means for suppressing storage, when the computer program is executed, of a copy of a variable dependent on a uniform instruction.

FIG. 1 schematically illustrates a set of four control flow graphs labelled case 1-4. Those of ordinary skill in the art will be familiar with this style of analysis of the different logical paths which may be followed through a computer program. In all four cases illustrated in FIG. 1 the first block ends with a non-uniform (also known as variant) conditional branch instruction. Accordingly, when executed the different logical paths which may be followed (i.e. the branch targets) from the top block in each case must be in different run-time threads, and for this reason any blocks which are to be found along those different logical paths are labelled as divergent. Indeed, according to the present analysis a block is defined as divergent if (and only if) it can't be executed on all run-time threads. Turning to the instructions which are contained within the basic blocks shown in FIG. 1, the four cases illustrated show various variable definitions, and in particular highlight examples where the operands of a given instruction can originate within the same divergent branch or within different divergent branches. For the purpose of identifying which instructions (i.e. which variable definitions) are uniform or non-uniform within the present analysis, a value is defined as variant if (and only if) it directly or indirectly depends on the ID of the run-time thread in which the value can be computed. Accordingly, in the four cases illustrated, x3 in cases 1 & 2, and x3 and x6 in case 3 should be identified as uniform values, whilst x5 in case 2, x7 in case 3 and x7 in case 4 should be identified as non-uniform since the definition of each of these values will depend on which logical path have been taken through the program. Particular focus is made here on the variable definitions which incorporate a phi instruction, that being one in which two or more variable definitions are merged into a single variable definition, where the operands of the phi instruction originate in more than one preceding block. The systematic analysis procedure presented by the method described hereinafter is able to correctly identify each of the examples discussed above of uniform or non-uniform variable definitions, whereas prior art approaches are not always been able to do so.

FIG. 2A schematically illustrates an example sequence of program instructions (code) which may be broken down into four basic blocks, labelled A-D. The program begins with basic block A, whereafter depending on the value of x, either basic block B or basic block C are executed, followed by the execution of basic block D whatever the value of x. A control flow graph representation of this program code is shown in FIG. 2B demonstrating the two logical paths which may be followed from the initial basic block A to the final basic block D. Each node of the control flow graph shown in FIG. 2B is labelled with a tag ID, these tag IDs being a feature of the present analysis used to identify logical flow paths through a given control flow graph. As can be seen in FIG. 2B, the entry basic block A is associated with a tag ID "ENTRYTID", whilst the basic blocks B and C have been allocated new tag IDs "TID1" and "TID2" respectively. The basic block D corresponds to the tag ID "ENTRYTID" since regardless of whether path B or C was taken through the program, these paths recombine at basic block D. The allocation of these tag IDs may be compared to the representation shown in FIG. 2C, in which the execution of this program code by run-time threads is schematically illustrated. In particular, in this example illustration, four run-time threads T1-T4 are shown. Due to the nature of the instructions in basic block A, these four run-time threads can execute in parallel for this section of program code, whilst basic blocks B and C are executed by run-time threads T1/T2 and T3/T4 respectively. Basic block D, like basic block A, is executed in parallel by all four run-time threads. The correspondence between tag IDs and run-time threads can also been seen in FIG. 2C, wherein the tag IDs correspond to the logical flow paths through the program code, and thus whilst "ENTRYTID" corresponds to all four run-time threads, TID1 corresponds to run-time threads T1 and T2, and TID2 corresponds to run-time threads T3 and T4.

Figure 3:
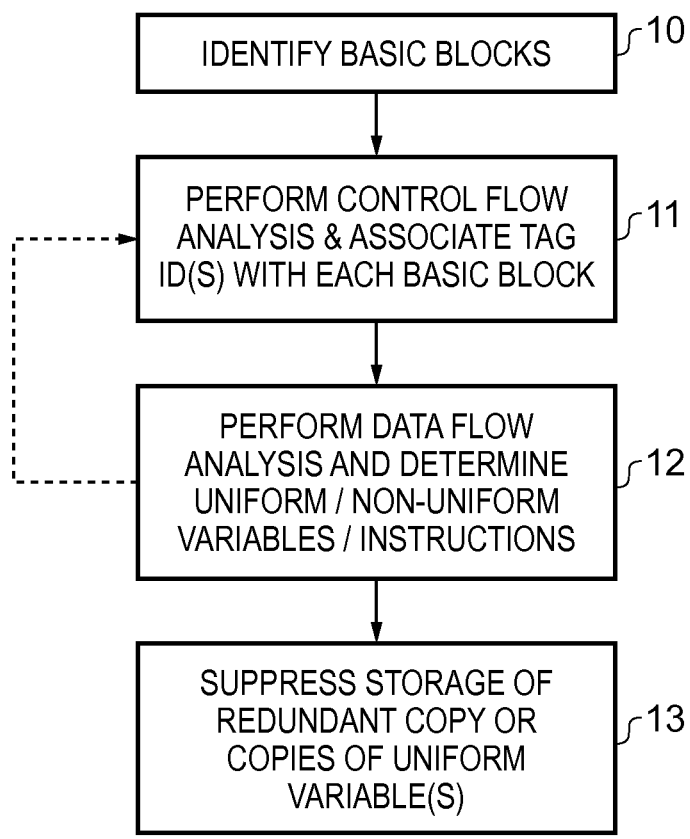
FIG. 3 schematically illustrates a sequence of steps which are taken in a method according to one embodiment.

A schematic high-level view of the method presented herein is shown in FIG. 3. At the most general level the method may be considered to be comprised of four steps as shown in the figure. Initially, at step 10 the basic blocks within the program code are identified, these being sets of instructions which have only one entry point and one exit point. Next at step 11, a control flow analysis of these basic blocks is performed, in essence generating a control flow graph on the basis of the logical flow possibilities between those basic blocks. As part of this control flow analysis a set of tag IDs (i.e. at least one tag ID) is associated with each basic block. Then at step 12 a data flow analysis is performed, in particular in which it is determined which variables/instructions are uniform and which are non-uniform. Notice from FIG. 3 that a possible flow path exists from step 12 to step 11, this representing the fact that the outcome of the data flow analysis can affect the performance of the control flow analysis (in particular because in an embodiment to be described hereinafter, the data flow analysis is nested within the control flow analysis). More details of the interaction of the control flow analysis and the data flow analysis will be given below. Finally at step 13 on the basis of the outcome of the analysis performed, the storage (when the program is executed) of any redundant copies of variables which have been identified as uniform is performed as an optimisation which for example saves memory allocation in the data processing system on which the program is executed.

Figure 4:
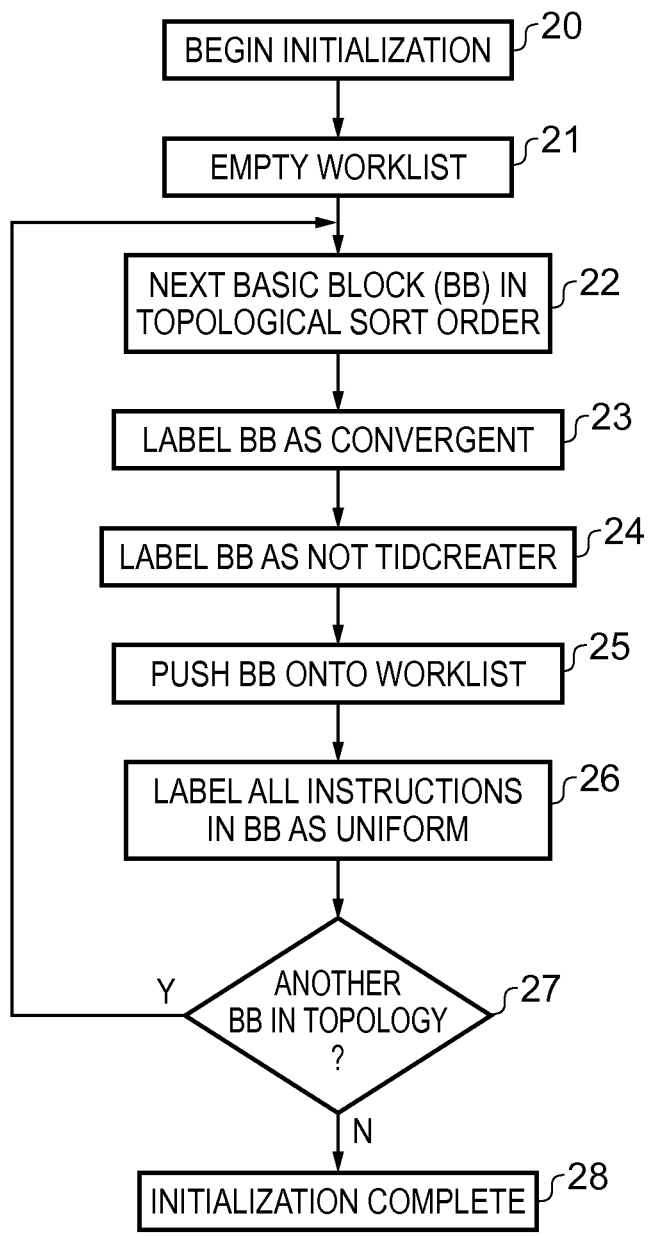
FIG. 4 schematically illustrates a sequence of initialisation steps which are taken in one embodiment.

More detailed steps of an example analysis method in one embodiment are now described with reference to FIGS. 4-9. Firstly, as schematically illustrated in FIG. 4, various initialisation steps are carried out. The initialisation begins at step 20, whereafter at step 21 a "worklist" arranged to operate as a queue is emptied. The next basic block (viewed in topological sort order) is then identified at step 22 and at step 23 this basic block is labelled as "convergent", whilst at step 24, this basic block is labelled as not "TIDCreator". At step 25 this basic block is pushed onto the work list and at step 26 all instructions in this basic block are labelled as being uniform. At step 27 it is determined if there is another basic block in the topology of the computer program (i.e. viewed as a control flow graph) and if there is the flow returns to step 22 for the next basic block to be initialised. If there are no further basic blocks in the topology to be initialised, then at step 28 the initialisation is complete.

Figure 5A:
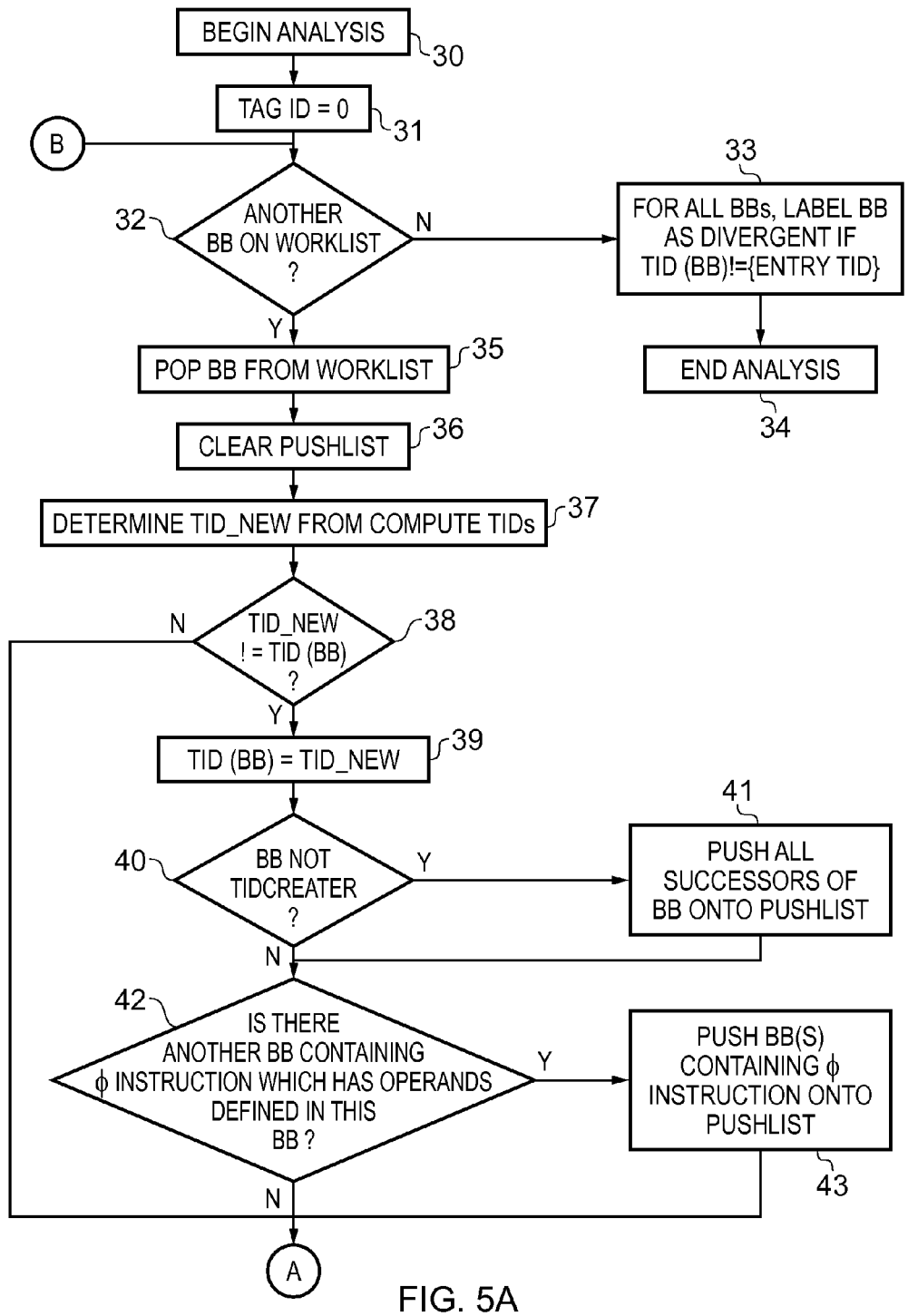
FIGS. 5A and 5B schematically illustrate in more detail a sequence of steps which may be taken in the method of one embodiment.
Figure 5B:
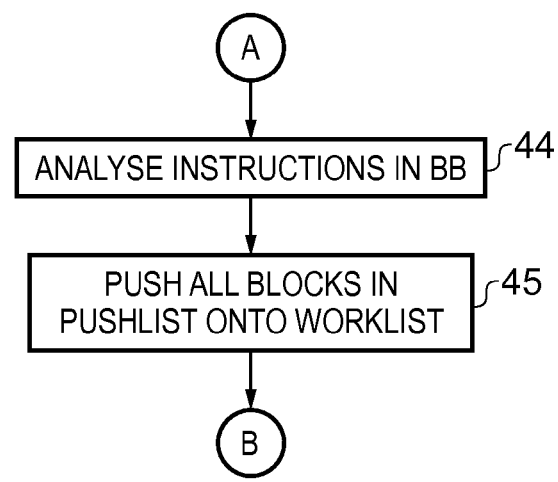
Figure 6:
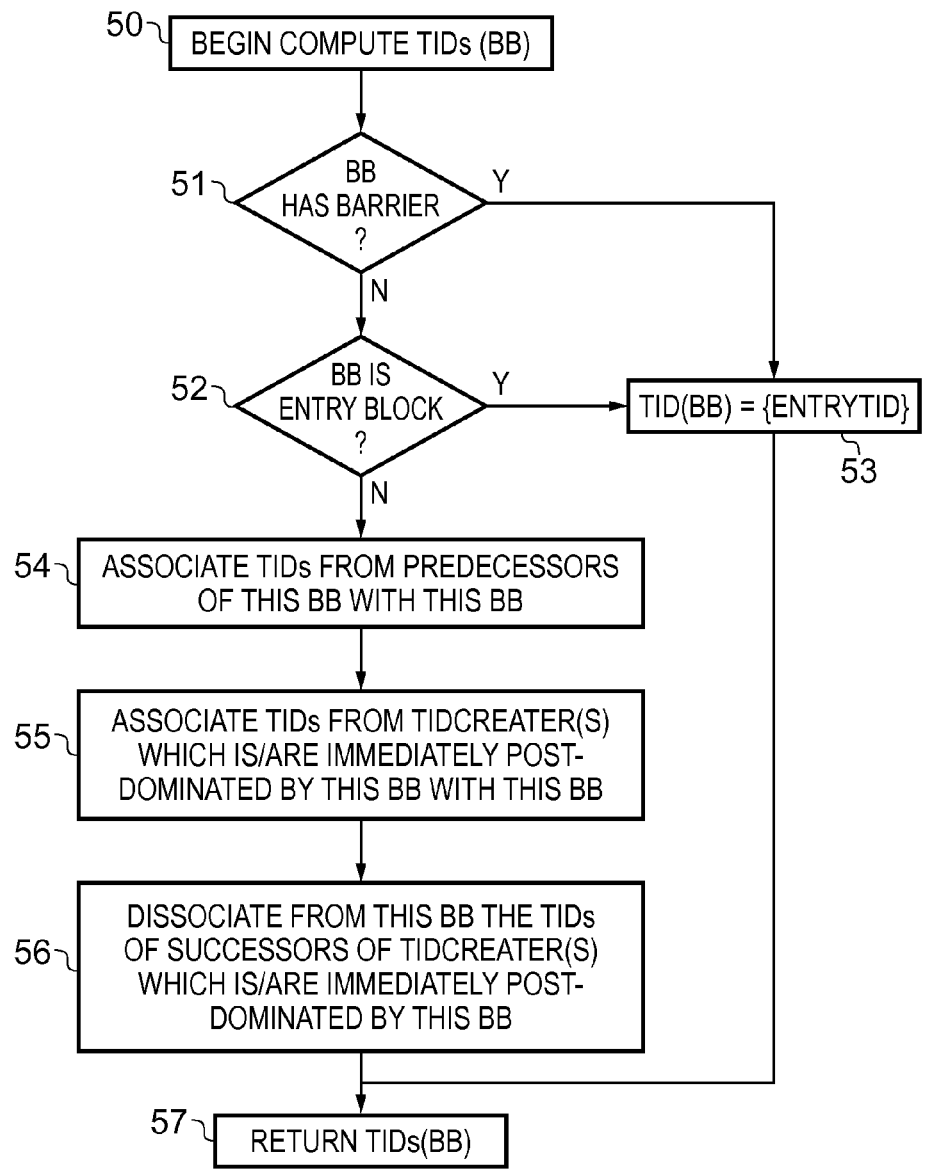
FIG. 6 schematically illustrates a sequence of steps which may be taken when carrying out a function to associate tag IDs with basic blocks in one embodiment.

The main steps of the analysis method itself are schematically illustrated in FIGS. 5A and 5B. The analysis flow begins at step 30, whereafter at step 31 the value "tag ID" is set to zero. Then at step 32 it is determined if there is a basic block available on the work list for analysis, and where there is (which of course there will be at the first iteration following the initialisation procedure of FIG. 4) the flow proceeds to step 35 where the next basic block is popped from the work list. At the following step 36 a further queue structure "pushlist" is cleared (pushlist is used to integrate the data flow analysis into the control flow analysis and provide the feedback path from step 12 to step 11 mentioned above with respect to FIG. 3, as will be explained in more detail below). Then at step 37 a (new) set of tag IDs associated with the current basic block being analysed is determined using the COMPUTETIDS function described in more detail below with reference to FIG. 6. The bracketed reference to "new" with respect to the set of tag IDs is in recognition of the fact that whilst on the one hand a set of tag IDs for a given basic block will always be "new" for the first time that basic block is analysed, on the other hand a basic block may be analysed more than once and hence its associated set of tag IDs may change. As mentioned above, it should be appreciated that a "set of tag IDs" is intended here in the strict mathematical sense, in that this set may comprise only one tag ID, but may also comprise more.

Then at step 38 it is determined whether the set of tag IDs determined at the previous step by the COMPUTETIDS function is different from the existing set of tag IDs associated with this basic block. If it is then at step 39 the new set overwrites the existing set associated with this basic block. Then at step 40 it is determined if this basic block is not labelled as "TIDCreator" (see below with reference to FIG. 7 for a discussion of what "TIDCreator" means). If this is true then the flow proceeds via step 41 where all successors of the current basic block (i.e. basic blocks with a direct edge from the current basic block) are pushed onto the pushlist. This is done so that the change in the set of tag IDs for the current basic block being analysed can be propagated through the control flow. From step 41, or directly from step 40 if this basic block is "TIDCreator", the flow proceeds to step 42 where it is determined if there is another basic block in the program being analysed which contains a phi instruction which has operands defined in this basic block. As mentioned above, a phi instruction is one which merges two or more variable definitions into a single variable definition from more than one predecessor basic block in the program. If there is then the flow proceeds via step 43 where the basic block (or basic blocks) containing such a phi instruction are pushed onto the pushlist. This is to propagate the new set of tag IDs through the data flow.

The flow continues at step 44 (see FIG. 5B) which is also the next step after a negative answer at either of steps 38 or 42. At step 44, the instructions within the basic block currently being analysed are considered. This represents the core of the data flow analysis and more detailed steps of this are set out in FIG. 7 described below. Finally, at step 45 all basic blocks to be found on the pushlist are pushed onto the worklist and thereafter the flow returns to step 32 (see FIG. 5A) where it is determined if there is another basic block available for analysis on the worklist. Once all basic blocks on the work list have been analysed, following a negative answer at step 32 the flow proceeds to step 33 where any basic blocks in the program which are associated with a set of tag IDs which differs from the set which only contains "ENTRYTID", are labelled as "divergent" blocks. Note that the tag ID "ENTRYTID" is equivalent to Tag ID=0. The analysis then concludes at step 34. It will be understood, as described with reference to FIG. 3, that the final step of the method described herein is that when the program is executed the storage of redundant copies of any variables identified as uniform by the analysis and then be suppressed.

More detail of the COMPUTETIDS function mentioned above are now described with reference to FIG. 6. The function begins at step 50 whereafter as an initial step at step S1it is determined if this basic block contains a barrier instruction. If it does then, at step 53, this basic block is assigned (only) the tag ID "ENTRYTID" associated with the first basic block of the computer program. Similarly, if at step 52 it is determined that this basic block is the entry block of the program code it is also assigned the initial "ENTRYTID" tag ID. From step 53 the flow proceeds directly to the conclusion of the function at step 57 where the determined tag ID(s) is/are returned. If however at step 52 it is determined that this basic block is not the entry block then at step 54 the tag IDs from all predecessors of this basic block (i.e. those basic blocks directly connected to and leading to this basic block) are associated with this basic block. Then at step 55 the tag IDs from any basic blocks labelled as TIDCreator which are immediately post dominated by this basic block are associated with this basic block. Finally at step 56 any tag IDs associated with the successors of a TIDCreator block which is immediately post dominated by the current basic block are dissociated from the current basic block. In other words (with respect to steps 54-56), for the current basic block its resulting set of tag IDs consists of those tag IDs associated with its predecessors (i.e. those blocks having direct edges leading to this current block), those tag IDs associated with a TIDCreator block which is immediately post dominated by this basic block, minus those tag IDs associated with the successors of such TIDCreator blocks (i.e. the blocks having direct edges coming from those TIDCreator blocks). Finally, at step 57 the computed set of tag IDs for this basic block are returned.

Mathematically expressed, steps 54-56 of the COMPUTETIDS function can thus be seen to be a solution to the following equation:

$$TID(BB) = \left( \bigcup_{PB \in pred(BB)} TID(PB) \right) + \left( \bigcup_{\substack{TB \in IPDEE(BB) \\ IsTIDCreator(TB)}} TID(TB) \right) - \left( \bigcup_{\substack{TB \in IPDEE(BB) \\ IsTIDCreator(TB)}} \left( \bigcup_{SB \in succ(TB)} TID(SB) \right) \right)$$

wherein IPDEE stands for "immediate post dominatee of", pred stands for "predecessor of" and succ stands for "successor of".

The procedure for analysing instructions in each basic block (step 44 in FIG. 5B) is now described in more detail with reference to FIG. 7. The process begins at step 60 whereafter at step 61 the next instruction to be analysed in the basic block is determined. Then at step 62 it is determined if this instruction is uniform or non-uniform. Further detail of this determination will be described with reference to FIG. 8. Thereafter at step 63 it is determined if this instruction is non-uniform and was not previously determined as such. If the instruction is uniform or has previously been determined as non-uniform then the flow returns to step 61 for the next instruction in the basic block to be analysed. Once there are no further instructions in the basic block to be analysed the flow proceeds to step 69 where all basic blocks on the pushlist are pushed onto the worklist and the instruction analysis procedure is complete at step 70.

If however at step 63 it is determined that the current instruction is newly determined as non-uniform, then at step 64 any basic blocks which contain instructions which use the result of this non-uniform instruction are pushed onto the pushlist. This is because any instructions which use a non-uniform instruction result must themselves be non-uniform and pushing the corresponding basic blocks onto the pushlist enables this identified non-uniformity to be efficiently propagated through the control flow data flow. Next at step 65 it is determined if the current instruction is a conditional branch instruction having more than one successor basic block and is not already labelled as "TIDCreator". This not being the case, the flow returns to step 61. However when this is the case then a non-uniform conditional branch instruction has been newly identified and at step 66 is labelled as "TIDCreator". All successors of this basic block are then pushed onto the pushlist at step 67 and at step 68 the function CREATETID is called. Further detail of the CREATETID function will be described in more detail below with reference to FIG. 9. Thereafter the flow returns to step 61.

Figure 7:
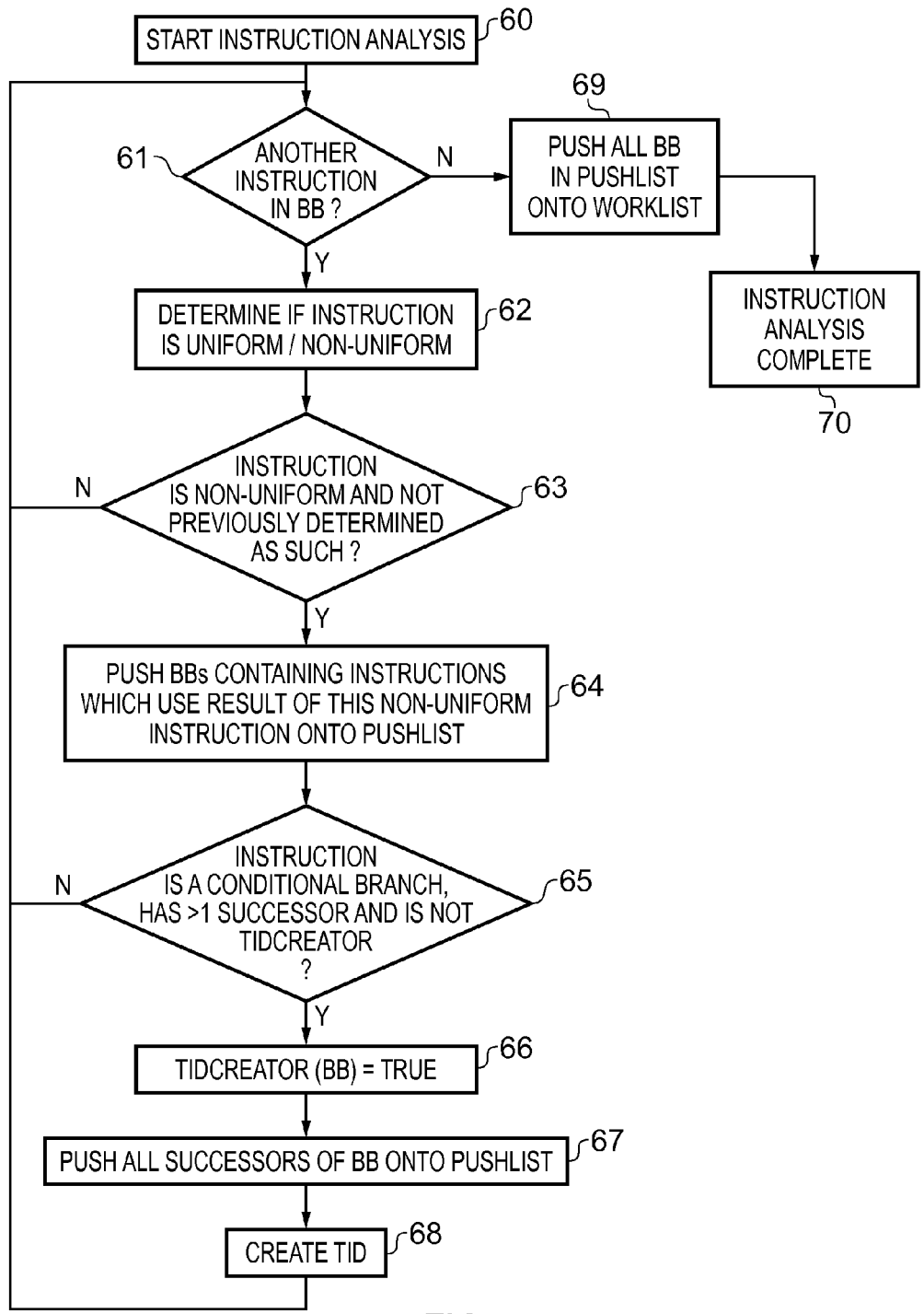
FIG. 7 schematically illustrates a sequence of steps which may be taken in a data flow analysis within the method of one embodiment.
Figure 8:
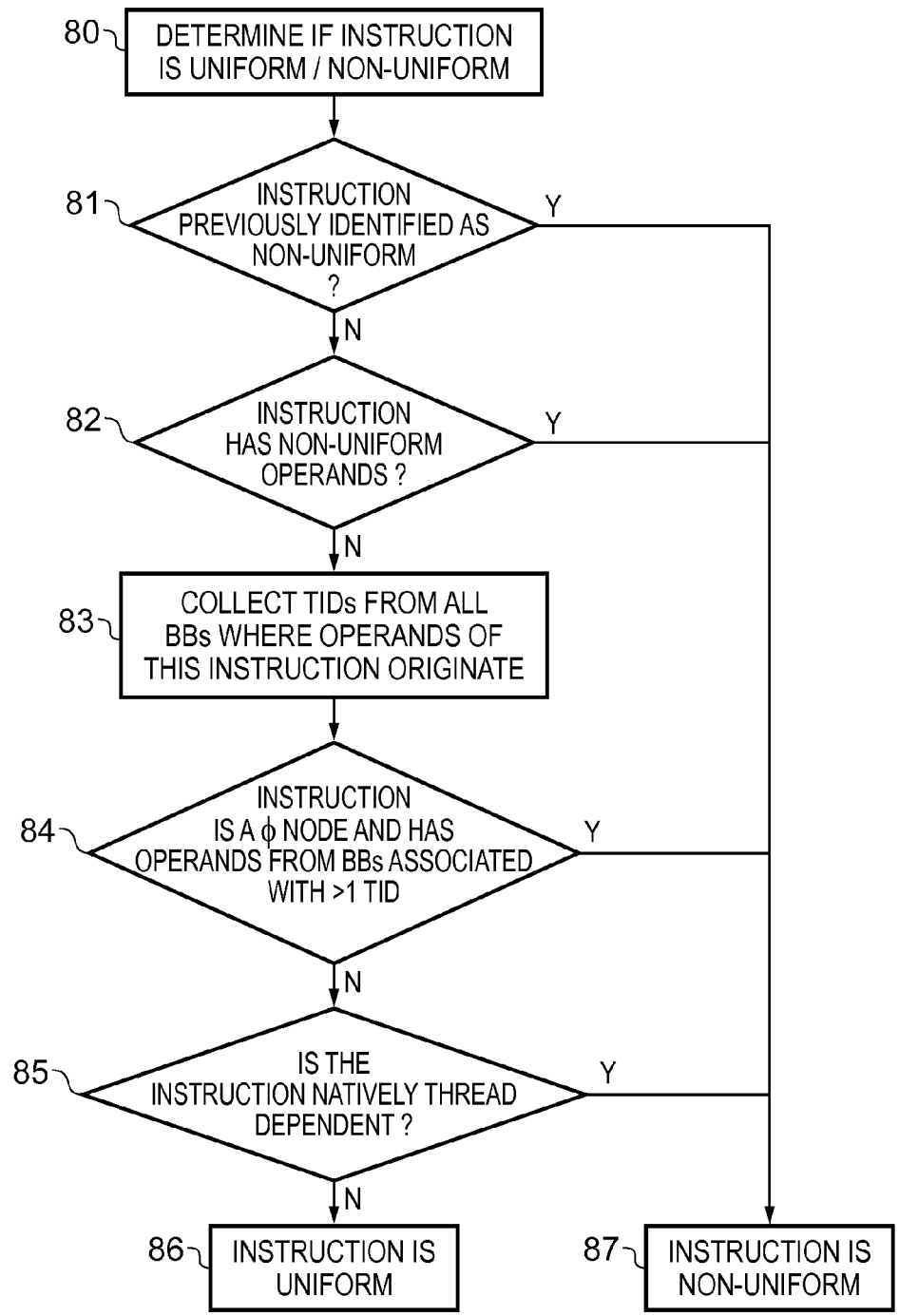
FIG. 8 schematically illustrates a sequence of steps which may be taken to determine whether an instruction is uniform or non-uniform in the method of one embodiment.

Further detail of the procedure according to which it is determined if an instruction is uniform or non-uniform (step 62 in FIG. 7) is now described in more detail to reference to FIG. 8. The procedure begins at step 80, where after at step 81 it is determined if the instruction has previously been identified as non-uniform. If it has then the flow proceeds directly to the conclusion (at step 87) that this instruction is non-uniform. If however the instruction has not previously been identified as non-uniform then the flow proceeds to step 82 where it is determined if the instruction has non-uniform operands. If it has (and the non-uniformity of those operands must therefore mean that this instruction itself is non-uniform) then the flow proceeds directly to step 87 with the conclusion that this instruction is non-uniform. If however, at step 82, it is determined that the instruction does not have non-uniform operands then at step 83 a set of tag IDs associated (thus far) with all basic blocks where operands of this instruction originate are gathered. Then at step 84 it is determined if this instruction is a phi node and has operands with basic blocks associated with more than one tag ID (i.e. with reference to the number of different tag IDs gathered at step 83). If this is true then the flow proceeds to step 87 where it is determined that this instruction is non-uniform. Finally, at step 85 it is determined if the instruction itself is natively thread dependent. If it is then the flow proceeds to step 87 where the instruction is determined to be non-uniform. Only with a final negative answer to the question at step 85 is (at step 86) the instruction determined to be uniform.

Figure 9:
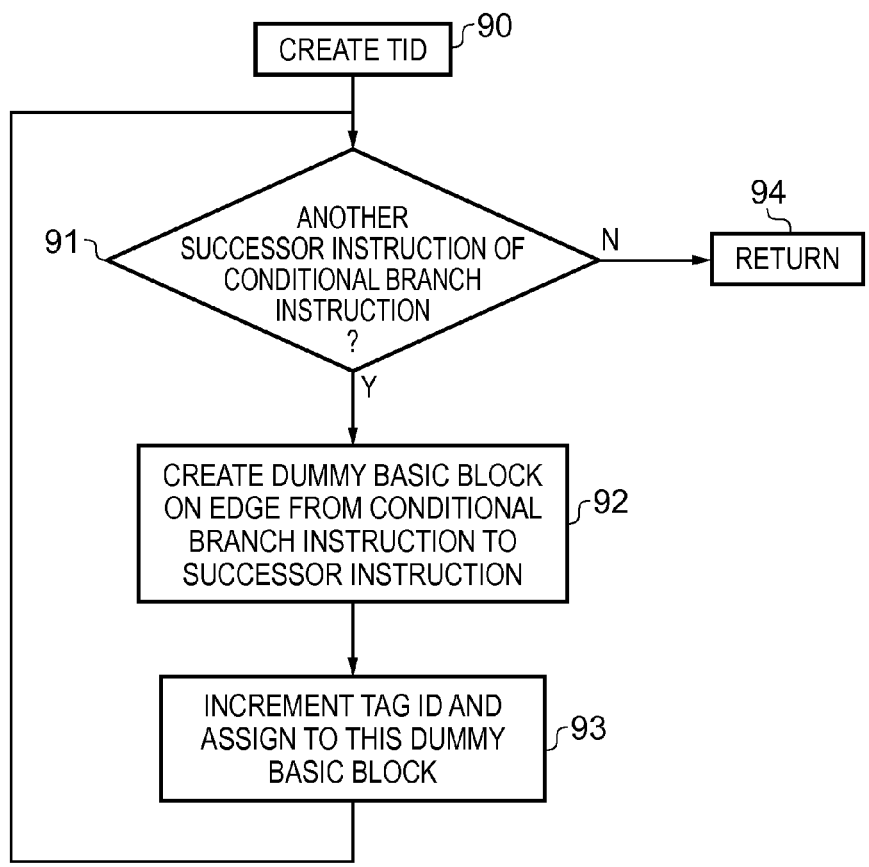
FIG. 9 schematically illustrates a sequence of steps which may be taken to create new tag IDs and dummy basic blocks when a non-uniform conditional branch instruction is encountered in the method of one embodiment.

FIG. 9 describes in more detail the CREATETID function (step 68 of FIG. 7). The function begins at step 90 whereafter at step 91 it is determined if there is another successor instruction of this conditional branch instruction to be considered. This being the case, at step 92 a dummy basic block is created on the edge from the conditional branch instruction to the successor branch instruction (i.e. on the edge from the basic block which contains the conditional branch instruction to the base ^^ to the successor basic block which contains that successor instruction) and at step 93 the value tag ID is incremented and assigned to this dummy basic block. The flow then returns to step 91 such that a dummy basic block and new tag ID can be assigned to each logical path which may be followed from this conditional branch instruction. Once this process has been completed then the process concludes at step 94.

FIGS. 10A and 10B show a pseudo-code example implementation of the analysis method of one embodiment which can be seen to correspond to the flow diagram steps set out in FIGS. 4-9.

Figure 11:
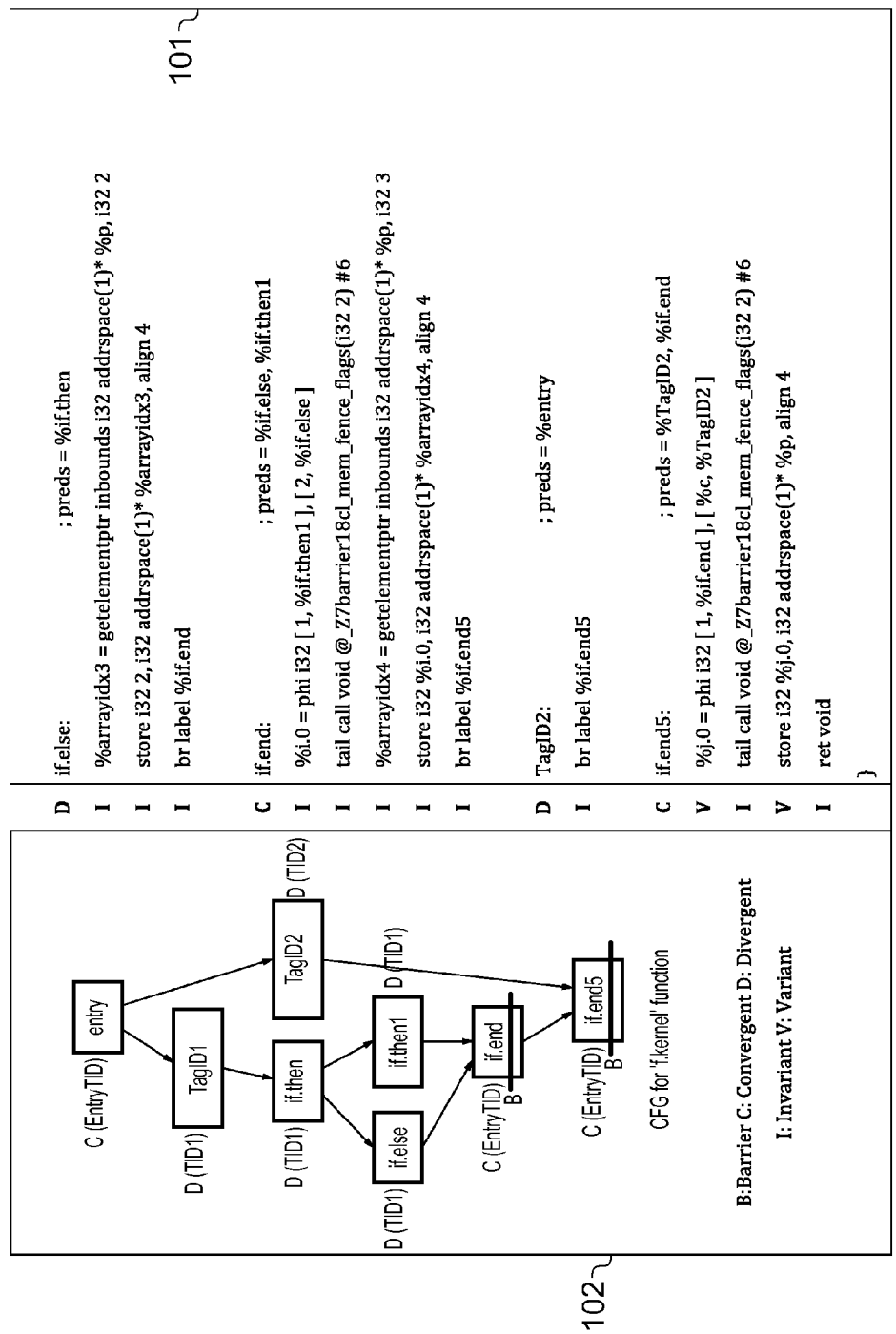
FIG. 11 shows an OpenCL program example, a corresponding control flow analysis, an intermediate representation following compilation of the program, and the identification of basic blocks as convergent or divergent and instructions as uniform or non-uniform.

FIG. 11 gives an overview of the process of the method of one embodiment applied to an example computer program. The example computer program, the input to the method, is the OpenCL program shown in the upper left portion of the figure labelled 100. The right hand column of FIG. 11 (labelled 101) shows a LLVM IR (i.e. LLVM compiler intermediate representation—see http://llvm.org) result for the OpenCL program 100, with the addition of labels corresponding to the basic blocks of the program following analysis according to the present method (i.e. the labels: entry, TagID1, if.then, if.then1, if.else, if.end, TagID2 and if.end5). Lower left in FIG. 11 (labelled 102) shows the corresponding control flow graph after the analysis performed by the present method. The central column labelled 103 shows the analysis result in terms of convergent/divergent basic blocks and uniform/non-uniform (i.e. in variant/variant) instructions.

It can be seen from the program code 100 in FIG. 11 that various logical paths may be taken through the program code when executed, in particular in dependence on:
whether p[k] is less than 16; and
the value of c.

These two determining factors result in the two branchings which can been seen in the control flow graph 102. However notice in addition that the variable k is defined by "get_global_id( )+4", which is an explicitly thread dependent statement, such that k must be non-uniform. By contrast, c is a simple parameter and therefore uniform.

Following the analysis method described above, each instruction is evaluated as either uniform (invariant) or non-uniform (variant) as the labels 103 in FIG. 11 show. Notice in particular that the branch instruction which ends the "entry" basic block has been determined to be non-uniform, whilst the branch instruction which ends the "if.then" basic block has been determined to be uniform. As a consequence, in the analysis, the "entry" basic block will have been determined to be TIDCreator and new tag IDs have been associated with the generated dummy basic blocks which follow it (TagID1 and TagID2). By contrast the "if.then" basic block has not generated any dummy basic blocks or associated new tag IDs.

Further note that all instructions in the "entry" basic block have been determined to be non-uniform. This is due to the fact that the "entry" basic block comprises the instruction "get_global_id" which in natively thread dependent, i.e. non-uniform. All other statements in this "entry" basic block have been propagated as variant through a def-use chain. For example, "% call" is defined in the first line of the "entry" basic block, then used in the second line. Next, "% add" defined in the second line is used in the third line. This chain follows throughout the "entry" basic block, resulting in all instructions in this basic block being determined to be non-uniform.

The statement "store i32% add, i32 addrspace(1)*% arrayidx2, align 4" in the "if.then1" basic block has been determined to be non-uniform because the operand % add (defined in the "entry" basic block) is non-uniform.

Now consider the two "phi" instruction statements, which begin the "if.end" and "if.end5" basic blocks respectively. Note that these correspond to the fact that the values of "i" and "j" which are assigned to the variables p[3] and p[0] in the original program code will depend on which logical path has been followed through the program code at execution. Such statements can prove to be difficult for prior art analysis techniques to handle if the barrier instructions are not present, and in particular without the first barrier instruction in the "if.end" basic block prior art approaches would not be able to recognise the variable "i" as uniform. However, it should be noted that following the present analysis method, the variable "i" can be determined to be uniform regardless of the presence of the barrier instruction in the "if.end" basic block. This is due to the fact that both predecessor basic blocks (i.e. the "if.else" and "if.then1" basic blocks) are associated with the same tag ID (namely TID1). This can be contrasted to the second of these statements (in the "if.end5" basic block) which has been determined to be non-uniform. The predecessor basic blocks in this case (i.e. the "if.end" and "TagID2" basic blocks) are associated with two different tag IDs (namely TID1 and TID2).

Finally, note that the statement "store i32% j.0, i32 addrspace(1)*% p, align 4" in the "if.end5" basic block has also been determined to be non-uniform because the operand % j.0 (defined two lines previously) is non-uniform.

Figure 12:
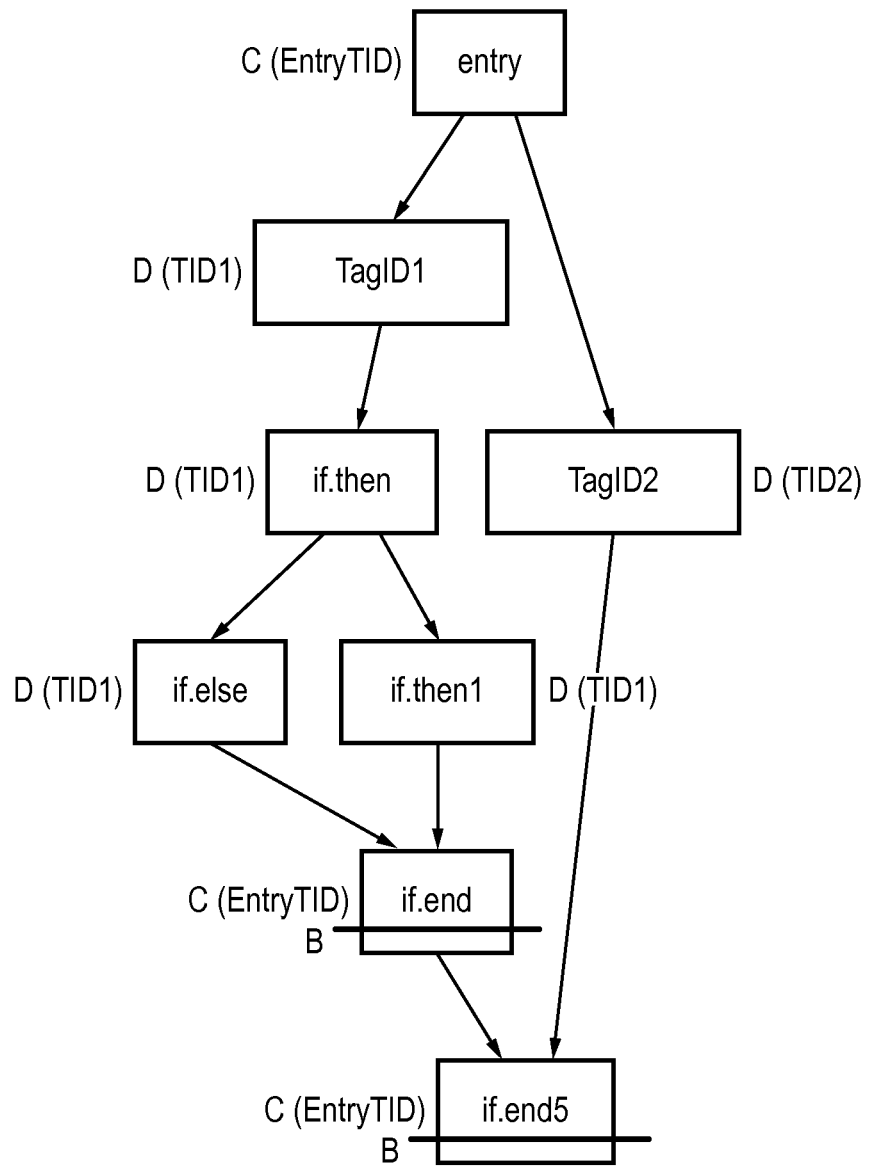
FIG. 12 shows the control flow graph of FIG. 11.

The control flow graph 102 of FIG. 11 is reproduced in FIG. 12 for the purposes of discussing in a little more detail how the tag IDs are associated with each basic block, in particular in situations where one or both of the two barrier instructions is not present. Refer also the explanation of the COMPUTETIDs function given with reference to FIG. 6. Some care is needed in considering this (unamended) control flow graph and the associated tag IDs, since there is a barrier instruction inside the basic block "if.end" and "if.end5". As can for example be seen from step 51 of FIG. 6, when a basic block is found to contain a barrier instruction, the tagID EntryTID (alone) is always associated.

Consider therefore the control flow graph of FIG. 12, initially without any barrier instructions. When the analysis reaches the basic block "if.end", the following happens:
[step 54] TID(if.end)=TID(if.else)|TID(if.then1)={TID1}
[step 55] do nothing, because no "TIDCreator" basic block is immediately post dominated by the "if.end" basic block.
[step 56] do nothing, because no "TIDCreator" basic block is immediately post dominated by the "if.end" basic block.

When the analysis reaches the basic block "if.end5", all other blocks should already have been analyzed, and the following happens:
[step 54] TID(if.end5)=TID(if.end)|TID(TagID2)={TID1, TID2}
[step 55] TID(if.end5)+=TID(entry), because the basic block "entry" is immediately post dominated by the basic block "if.end5" and the basic block "entry" is "TIDCreator". So TID(if.end5)={EntryTID, TID1, TID2}
[step 56] TID(if.end5)-={TID(TagID1), TID(TagID2)}, because basic block "entry" is immediately post dominated by basic block "if.end5", basic block "entry" is "TIDCreater", and the basic blocks "TagID1" and "TagID2" are successors of the basic block "entry". So TID(if.end5)={EntryTID}

Consider now the case if a barrier instruction is introduced for the basic block "if.end", and the basic block "if.end5" still doesn't have a barrier. Firstly when the analysis reaches basic block "if.end", TID(if.end)={EntryTID}, because basic block "if.end" now has a barrier.

When the analysis reaches the basic block "if.end5", all other blocks should already have been analyzed, and the following happens:
[step 54] TID(if.end5)=TID(if.end)|TID(TagID2)={EntryTID, TID2}
[step 55] TID(if.end5)+=TID(entry), because the basic block "entry" is immediately post dominated by the basic block "if.end5" and the basic block "entry" is "TIDCreator". So TID(if.end5)={EntryTID, TID2}
[step 56] TID(if.end5)-={TID(TagID1), TID(TagID2)}, because basic block "entry" is immediately post dominated by basic block "if.end5", basic block "entry" is "TIDCreater", and the basic blocks "TagID1" and "TagID2" are successors of the basic block "entry". So TID(if.end5)={EntryTID}.

Finally consider the case where there is no barrier instruction introduced for the basic block "if.end", but the basic block "if.end5" does now have a barrier instruction.

When the analysis reaches the basic block "if.end", all other blocks should already have been analysed, and the following happens:
[step 54] TID(if.end)=TID(if.else)|TID(if.then1)={TID1}
[step 55] do nothing, because no "TIDCreator" basic block is immediately post dominated by the "if.end" basic block.
[step 56] do nothing, because no "TIDCreator" basic block is immediately post dominated by the "if.end" basic block.

When the analysis reaches the basic block "if.end5", all other blocks should already have been analyzed, and the following happens:
[step 53] TID(if.end5)={EntryTID}

Figure 13:
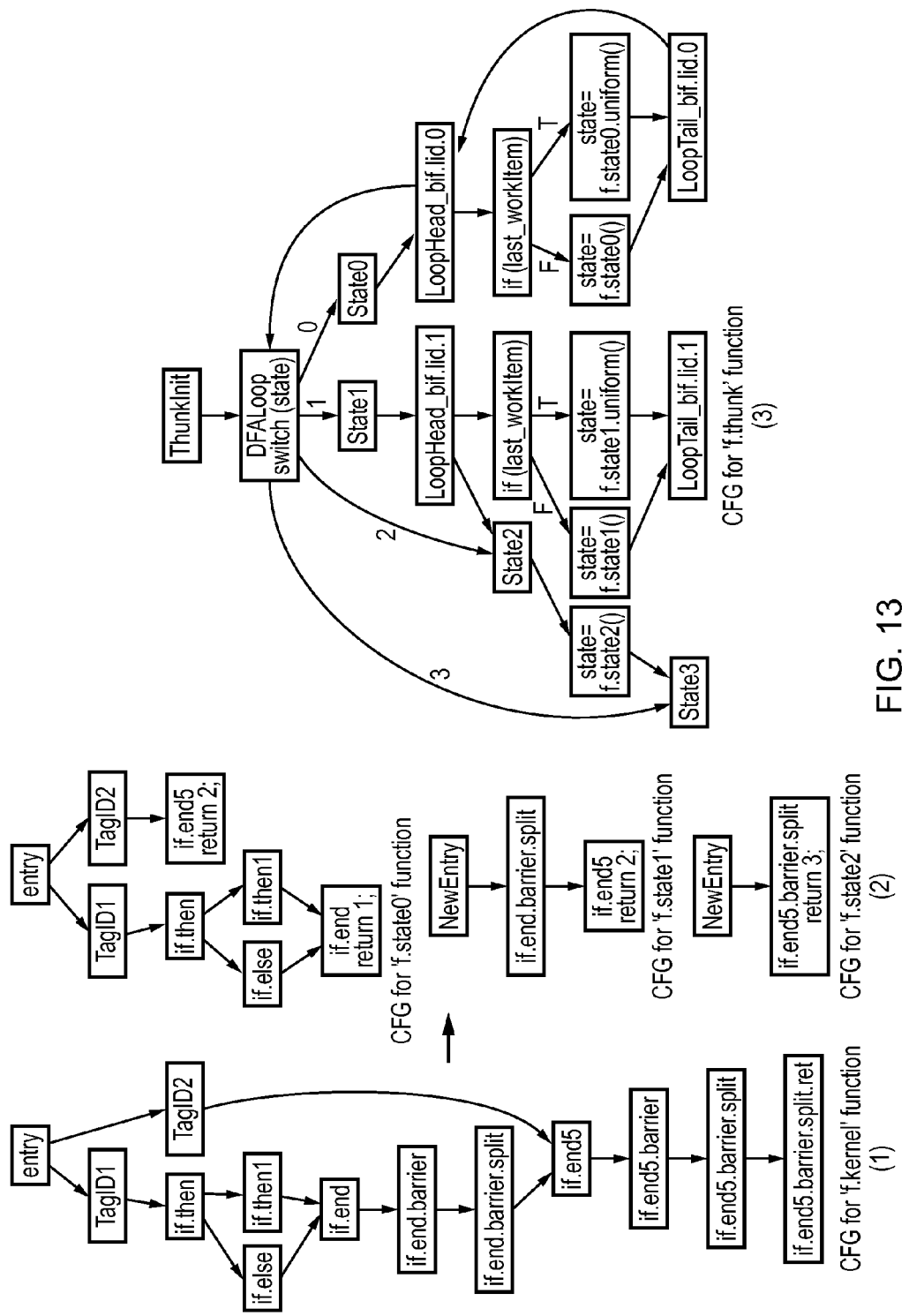
FIG. 13 illustrates a set of control flow graphs demonstrating the creation of kernel functions based on the FIG. 11 example.

We now turn to a consideration of the optimizations that can follow from the identification of a non-uniform variable/instruction. For an OpenCL kernel containing a barrier built-in function, the Continuation-Based Synchronization algorithm as described in the Karrenberg/Hack paper "Improving Performance of OpenCL on CPUs" mentioned above can be applied. Taking the case discussed with reference to FIGS. 11 and 12 as an example, we could have the transformations shown in FIG. 13. First of all, barriers are split into several separate basic blocks, and the original control flow graph (CFG) can be transformed into (1). Then 3 small kernel functions as shown in (2) can be made, mapping to different states across the barrier boundaries, and a thunk function as shown in (3) can be created as well to invoke the different state kernel functions. In this way the barriers can be implicitly removed. In the thunk function all work items in a workgroup are serialized by a loop with a local work item id as the loop index variable.

However, there are variables living across different state kernels in (2), so the different work item threads for different state kernels may hold different values for those live variables. For example, the non-uniform variable T lives from either state0 or state1 to state2, so we have to keep a context to hold this value for different work item threads. After the last assignment of variable T before exiting state0, we need to insert an instruction to store the context of T corresponding to the thread id, and we also need to insert an instruction to load from the corresponding thread-dependent context at state1 and state2's entry points.

Figure 15:
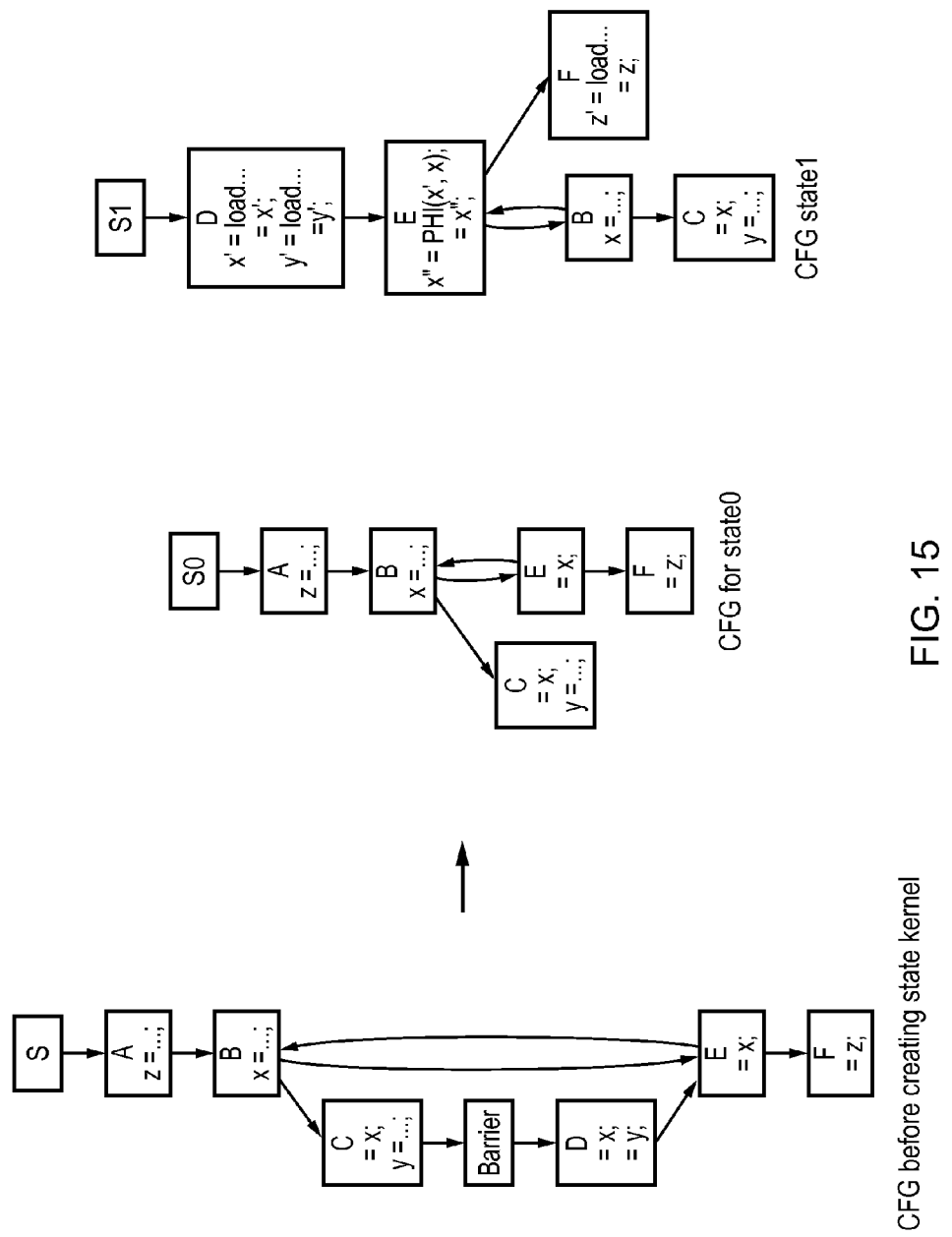
FIG. 15 illustrates control flow graphs before and after creating a state kernel.

Since the control flow is cut off on state kernel boundaries, we have to load a thread-dependent live variable context at the entry of state kernel, and replace the original uses with this new value. An algorithm for doing this replacement is set out in FIG. 14. To better explain this algorithm, take the case shown in FIG. 15 as an example. Generally speaking, for replacing live-in values there exist 4 different scenarios in basic blocks A, B, C, and D respectively (note that this labelling of basic blocks is specific to this figure and does not correspond to that of FIGS. 2A and 2C). Looking at the CFG for state1, in basic block C we need to insert a load instruction, and in block D we need to insert a new PHI instruction for the new loop.

Referring back to the example of FIG. 11/12, and considering the uniform variable 'i' living across the boundary of state0 and state1, we can keep a unique context space for it, because all work item threads hold the same value. Therefore, there is no need to store 'i' for all work item threads in state0, but it need only be stored for the last thread. From this example, we know we can reduce the number of context stores for uniform live variable context at a barrier point. Previously it would be necessary to store all live variables for all thread numbers, i.e. work item size, when not knowing if a live variable is uniform or not. Once it is known that a live variable is uniform, which means that all threads would generate the same result, the uniform live variables only need to be stored once in the last work item execution stage. As a result the memory saving can be expressed as NumOfUniformLiveVariables*(NumOfWorkItems−1). In the meantime, we only need to allocate one copy of live variable context memory to save the uniform value. For the case in FIG. 13, we create separate state kernel functions with the suffix .uniform to cover the storage of the uniform live variables.

Furthermore, if it is known that all instructions within a small state kernel are uniform, it can be treated as a scalar state kernel. For this case there is no need to generate the nested loops in the DFA (deterministic finite automation) loop of the kernel thunk at all, because every work item always generates the same value for all live variables. In this way, we would be able to save (NumOfWorkItems−1) times of loop iteration. For example, state2 is a scalar state kernel, so there isn't a loop wrapping the code of calling state2 in (2) of FIG. 13. This optimization is referred to as kernel scalarization.

Figure 16:
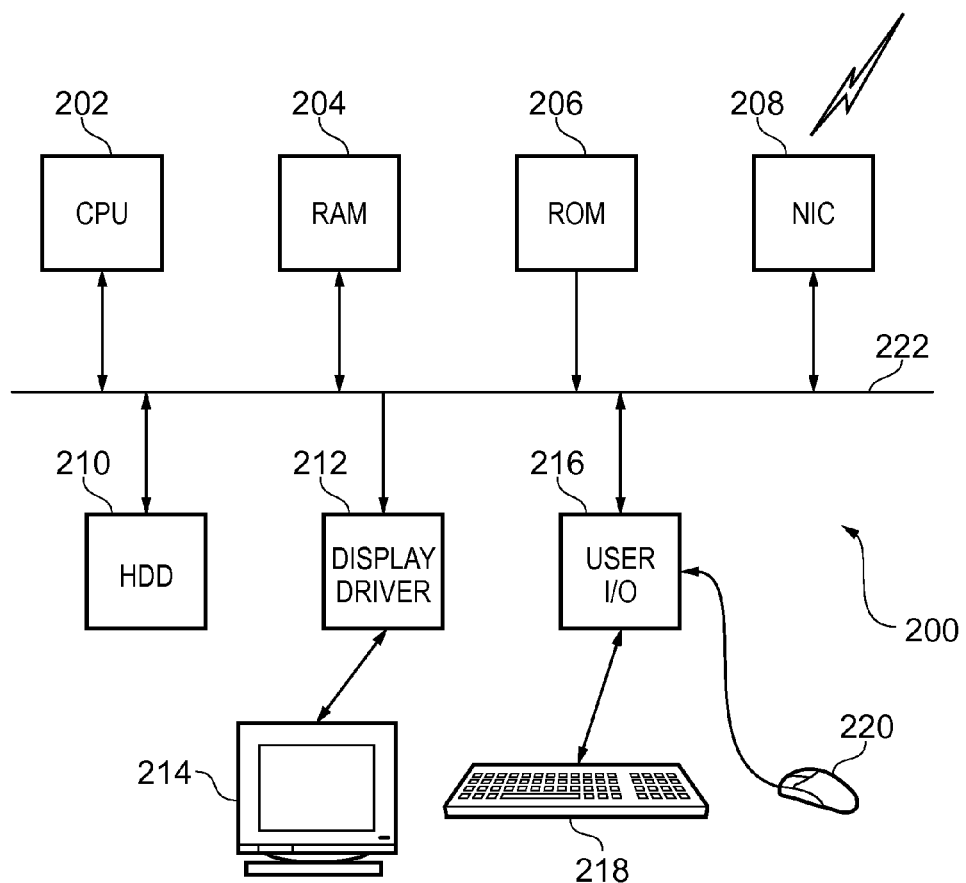
FIG. 16 schematically illustrates a general purpose computing device.

FIG. 16 schematically illustrates a general purpose computing device 200 of the type that may be used to implement the above described techniques. The general purpose computing device 200 includes a central processing unit 202, a random access memory 204 and a read only memory 206, connected together via bus 222. It also further comprises a network interface card 208, a hard disk drive 210, a display driver 212 and monitor 214 and a user input/output circuit 216 with a keyboard 218 and mouse 220 all connected via the common bus 222. In operation, such as when executing data processing instructions configured to cause the device to carry out the present analysis and optimization techniques, the central processing unit 202 will execute computer program instructions that may for example be stored in the random access memory 204 and/or the read only memory 206. Program instructions could be additionally retrieved from the hard disk drive 210 or dynamically downloaded via the network interface card 208. The results of the processing performed may be displayed to a user via a connected display driver 212 and monitor 214. User inputs for controlling the operation of the general purpose computing device 200 may be received via a connected user input output circuit 216 from the keyboard 218 or the mouse 220. It will be appreciated that the computer program could be written in a variety of different computer languages. The computer program may be stored locally on a recording medium or dynamically downloaded to the general purpose computing device 200. When operating under control of an appropriate computer program, the general purpose computing device 200 can perform the above described techniques and can be considered to form an apparatus for performing the above described techniques. The architecture of the general purpose computing device 200 could vary considerably and FIG. 16 is only one example.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A processor-executed method of optimizing execution of a computer program, the method comprising the steps of:
identifying basic blocks of instructions within the computer program, wherein each basic block has only one entry point and only one exit point;
performing a topology-based control flow analysis of the basic blocks to associate at least one tag ID with each basic block, wherein a tag ID identifies at least one run-time thread having a given run-time instruction sequence;
performing a data flow analysis of instructions within the basic blocks and their associated tag IDs to determine whether each instruction of said computer program is uniform or non-uniform, wherein a uniform instruction has a same value for all tag IDs associated with the basic block containing the uniform instruction,
wherein, in the data flow analysis, for each immediate successor basic block of an analysed basic block, when the analysed basic block ends with a non-uniform conditional branch instruction, a dummy block is generated on each edge from the analysed basic block to the immediate successor basic block and a new tag ID is generated for association with each dummy block,
wherein, in the topology-based control flow analysis, when the analysed basic block immediately post-dominates a second basic block and the second basic block ends with a non-uniform conditional branch instruction, any tag IDs associated with the second basic block are associated with the analysed basic block,
wherein, in the topology-based control flow analysis, when the analysed basic block immediately post-dominates a third basic block, and the third basic block ends with a non-uniform conditional branch instruction, tag IDs of successors of the third basic block are dissociated from the analysed basic block, and
wherein a phi instruction is determined to be non-uniform, wherein the phi instruction merges two or more variable definitions into a single variable definition from plural predecessor basic blocks of the analysed basic block, when operands of the phi instruction originate in basic blocks which are associated with more than one tag ID; and
suppressing storage, when the computer program is executed, of a copy of a variable dependent on a uniform instruction.

2. The method as claimed in claim 1, wherein the data flow analysis is nested within the topology-based control flow analysis.

3. The method as claimed in claim 1, wherein performing the topology-based control flow analysis of the basic blocks further comprises associating tag IDs of all predecessor basic blocks of the analysed basic block with the analysed basic block.

4. The method as claimed in claim 1, wherein the topology-based control flow analysis is initiated by pushing each basic block onto a worklist in topological sort order and the topology-based control flow analysis is iteratively performed on the basic blocks by popping a next basic block from the worklist at each iteration.

5. The method as claimed in claim 4, wherein when at least one tag ID associated with a selected basic block changes during the topology-based control flow analysis, and the selected basic block does not end with a non-uniform conditional branch instruction, the successor basic blocks of the selected basic block are pushed onto the worklist.

6. The method as claimed in claim 4, wherein when at least one tag ID associated with a further selected basic block changes during the topology-based control flow analysis, and when a second further selected basic block containing a phi instruction with operands defined in the further selected basic block is found, the second further selected basic block is pushed onto the worklist.

7. The method as claimed in claim 1, wherein when an instruction is determined to be non-uniform in the data-flow analysis, a further instruction which has that instruction as an operand is determined to be non-uniform.

8. The method as claimed in claim 7, wherein the topology-based control flow analysis is initiated by pushing each basic block onto a worklist in topological sort order and the topology-based control flow analysis is iteratively performed on the basic blocks by popping a next basic block from the worklist at each iteration, wherein a basic block comprising the further instruction is pushed onto the worklist.

9. The method as claimed in claim 1, wherein a basic block ending with a non-uniform conditional branch instruction is marked as tag ID creator.

10. The method as claimed in claim 9, wherein when an instruction is newly determined to be a non-uniform conditional branch instruction in the data-flow analysis, the analysed basic block is marked as tag ID creator and each basic block which is a successor of the analysed basic block is pushed onto the worklist.

11. The method as claimed in claim 1, wherein for a barrier basic block comprising a barrier instruction, an entry tag ID associated with an entry basic block of the computer program is associated with the barrier basic block.

12. The method as claimed in claim 1, wherein a natively thread-dependent instruction is determined to be non-uniform.

13. The method as claimed in claim 1, wherein each basic block is initially labelled as convergent and the method comprises a further step of labelling any basic block which is associated with more than an entry tag ID associated with an entry basic block of the computer program as divergent.

14. A data processing apparatus comprising a processor and a memory to configured to carry out the method of claim 1.

15. A non-transitory computer-readable storage medium storing a computer program configured to carry out the method of any of claim 1.

16. A data processing apparatus comprising a processor and a memory to optimize execution of a computer program, the data processing apparatus comprising:

means for identifying basic blocks of instructions within the computer program, wherein each basic block has only one entry point and only one exit point;

means for performing a topology-based control flow analysis of the basic blocks to associate at least one tag ID with each basic block, wherein a tag ID identifies at least one run-time thread having a given run-time instruction sequence;

means for performing a data flow analysis of instructions within the basic blocks and their associated tag IDs to determine whether each instruction of said computer program is uniform or non-uniform, wherein a uniform instruction has a same value for all tag IDs associated with the basic block containing the uniform instruction, wherein, in the data flow analysis, for each immediate successor basic block of an analysed basic block, when the analysed basic block ends with a non-uniform conditional branch instruction, a dummy block is generated on each edge from the analysed basic block to the immediate successor basic block and a new tag ID is generated for association with each dummy block, wherein, in the topology-based control flow analysis, when the analysed basic block immediately post-dominates a second basic block and the second basic block ends with a non-uniform conditional branch instruction, any tag IDs associated with the second basic block are associated with the analysed basic block, wherein, in the topology-based control flow analysis, when the analysed basic block immediately post-dominates a third basic block, and the third basic block ends with a non-uniform conditional branch instruction, tag IDs of successors of the third basic block are dissociated from the analysed basic block, and wherein a phi instruction is determined to be non-uniform, wherein the phi instruction merges two or more variable definitions into a single variable definition from plural predecessor basic blocks of the analysed basic block, when operands of the phi instruction originate in basic blocks which are associated with more than one tag ID;

and means for suppressing storage, when the computer program is executed, of a copy of a variable dependent on a uniform instruction.

\* \* \* \* \*